(12) United States Patent
Mukherjee et al.

(10) Patent No.: US 11,438,152 B2
(45) Date of Patent: Sep. 6, 2022

(54) DISTRIBUTED SYMMETRIC ENCRYPTION

(71) Applicant: Visa International Service Association, San Francisco, CA (US)

(72) Inventors: Pratyay Mukherjee, Sunnyvale, CA (US); Shashank Agrawal, Sunnyvale, CA (US); Peter Rindal, San Francisco, CA (US); Atul Luykx, San Francisco, CA (US); Wei Dai, La Jolla, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 47 days.

(21) Appl. No.: 16/779,422

(22) Filed: Jan. 31, 2020

(65) Prior Publication Data

US 2021/0243020 A1 Aug. 5, 2021

(51) Int. Cl.
*H04L 9/08* (2006.01)
*H04L 9/32* (2006.01)

(52) U.S. Cl.
CPC ............ *H04L 9/0869* (2013.01); *H04L 9/085* (2013.01); *H04L 9/3236* (2013.01); *H04L 9/3247* (2013.01)

(58) Field of Classification Search
CPC ... H04L 9/0869; H04L 9/3247; H04L 9/3236; H04L 9/085
See application file for complete search history.

(56) References Cited

U.S. PATENT DOCUMENTS 5,872,849 A * 2/1999 Sudia ...................... H04L 9/088
713/175
8,320,559 B1 11/2012 Boneh
(Continued)

FOREIGN PATENT DOCUMENTS

WO 2016135738 9/2016
WO 2017106793 6/2017
(Continued)

OTHER PUBLICATIONS

Agrawal, et al., "DiSE: Distributed Symmetric-Key Encryption", CC '18, Oct. 15-19, 2018, Toronto, ON, Canada, 25 pages.
PCT Application No. PCT/US2017/059073, International Search Report and Written Opinion dated Oct. 30, 2017.
Application No. PCT/US2021/014006, International Search Report and Written Opinion, dated May 10, 2021, 12 pages.

*Primary Examiner* — Jeffrey C Pwu
*Assistant Examiner* — Mayasa A. Shaawat
(74) *Attorney, Agent, or Firm* — Kilpatrick Townsend & Stockton LLP

(57) ABSTRACT

Systems and methods for improved distributed symmetric cryptography are disclosed. A client computer may communicate with a number of cryptographic devices in order to encrypt or decrypt data. Each cryptographic device may possess a secret share and a verification share, which may be used in the process of encrypting or decrypting data. The client computer may generate a commitment and transmit the commitment to the cryptographic devices. Each cryptographic device may generate a partial computation based on the commitment and their respective secret share, and likewise generate a partial signature based on the commitment and their respective verification share. The partial computations and partial signatures may be transmitted to the client computer. The client computer may use the partial computations and partial signatures to generate a cryptographic key and verification signature respectively. The client computer may use the cryptographic key to encrypt or decrypt a message.

18 Claims, 10 Drawing Sheets

(56) References Cited

U.S. PATENT DOCUMENTS

| | | |
|---|---|---|
| 8,984,268 B2 | 3/2015 | Vanheyningen |
| 9,246,674 B2 | 1/2016 | Brainis |
| 2016/0344836 A1 | 11/2016 | Erickson |
| 2018/0278594 A1* | 9/2018 | Schiffman ............. H04L 9/3271 |
| 2019/0356475 A1* | 11/2019 | Resch .................... H04L 9/008 |

FOREIGN PATENT DOCUMENTS

| | | | |
|---|---|---|---|
| WO | 2019088979 | 5/2019 | |
| WO | WO-2019088979 A1 * | 5/2019 | ........... H04L 9/0618 |

* cited by examiner

DISTRIBUTED SYMMETRIC ENCRYPTION

BACKGROUND

"Cryptography as a service" may refer to processes where one entity performs cryptographic operations on behalf of another entity. For example, a server computer may encrypt data (such as sensitive medical records or other private documents) on behalf of a client computer. At a later time, when the client computer wants to retrieve the encrypted data, the client computer may communicate with the server computer in order to decrypt the encrypted data. Alternatively or additionally, the client computer can transmit the encrypted data to another client computer. This other client computer may communicate with the server computer in order to decrypt the encrypted data. Thus cryptography as a service may be used to protect data across either time or space. Cryptography as a service may be desirable because servers may be better equipped to store sensitive cryptographic information, such as secret cryptographic keys.

Distributed cryptography using a shared secret is one technique that can be used to implement cryptography as a service. Rather than a single server computer performing cryptography for a client computer, a distributed network of cryptographic devices (e.g., server computers) can collectively perform cryptography for the client computer. Cryptographic materials, such as a secret key or shared secret can be divided into secret shares and distributed among the cryptographic devices. Those parties can collectively perform encryption or decryption using their respective secret shares. Distributed cryptography may provide security benefits when compared to conventional cryptography, because it is more difficult for an attacker to acquire the shared secret. An attacker must acquire multiple secret shares to reconstruct the secret key or shared secret or otherwise compromise the cryptosystem. By contrast, when cryptography is performed using a non-shared secret, the hacker may only need to acquire the non-shared secret to compromise the cryptosystem.

Cryptography, distributed or otherwise, may be categorized as symmetric or asymmetric. With symmetric cryptography, the same cryptographic key can be used to encrypt and decrypt data. With asymmetric cryptography, two cryptographic keys are used. Data encrypted using one cryptographic key must be decrypted using the other, and vis-versa. Asymmetric cryptography is typically much slower than symmetric cryptography, in some cases, up to three to five orders of magnitude slower. As a result, symmetric cryptography is usually preferable for high speed or high throughput cryptography as a service applications.

However, distributed symmetric cryptography as a service has some undesirable characteristics. As one example, it can be difficult to determine whether a client computer is encrypting data or decrypting data. Because the same cryptographic key is used for both encryption and decryption, a client computer can claim to use the service to encrypt data but instead decrypt data. This can be problematic because it makes it difficult to log or otherwise record client computer activity. A malicious client computer can abuse the system by lying about performing encryption operations, for example, in order to secretly decrypt data the malicious client is not privileged to access.

Thus, there is a need for improvements to distributed symmetric encryption.

SUMMARY

Embodiments are directed to improved systems and methods for distributed symmetric cryptography. A client computer and a plurality of cryptographic devices from a cryptographic device network can work together to generate a symmetric cryptographic key and a verification signature. The client computer can use the cryptographic key to encrypt a message and produce a ciphertext.

The client computer (or a receiving computer) and the cryptographic devices can also work together to decrypt the ciphertext and produce the message. When decrypting, the client computer can provide the verification signature to the cryptographic devices. The cryptographic devices can verify the verification signature. If the verification signature is legitimate, the cryptographic devices can work together with the client computer to produce the cryptographic key again. The client computer can then use the cryptographic key to decrypt the ciphertext. The cryptographic devices can determine whether the client computer is encrypting the message or decrypting the ciphertext based on the verification signature, as the verification signature is generated during encryption and verified during decryption.

One embodiment is directed to a method comprising performing, by a computer system: generating a commitment using a message and a random value; transmitting a request including the commitment to each of a plurality of cryptographic devices, the plurality of cryptographic devices storing a plurality of secret shares that are generated from a secret value and a plurality of verification shares generated from a verification value, the request indicating that each of the plurality of cryptographic devices are to perform a cryptographic function corresponding to encryption; receiving from the plurality of cryptographic devices, a plurality of partial computations, wherein the plurality of partial computations were generated by the plurality of cryptographic devices using the plurality of secret shares and the commitment; receiving, from the plurality of cryptographic devices, a plurality of partial signatures, wherein the plurality of partial signatures were generated by the plurality of cryptographic devices using the plurality of verification shares and the commitment; generating a cryptographic key based on the plurality of partial computations; generating a verification signature based on the plurality of partial signatures; generating a ciphertext by encrypting the message and the random value using the cryptographic key; and generating a payload comprising the ciphertext, the verification signature, and the commitment.

Another embodiment is directed to a method comprising performing, by a computer system: transmitting a verification signature and a commitment to a plurality of cryptographic devices, wherein the plurality of cryptographic devices verify the verification signature using a verification key and the commitment; receiving a plurality of partial computations, wherein the plurality of partial computations were generated by the plurality of cryptographic devices using the plurality of secret shares and the commitment; generating a cryptographic key based on the plurality of partial computations; and decrypting a ciphertext using the cryptographic key to produce a message and a random value.

Another embodiment is directed to a method comprising performing, by a cryptographic device: receiving, from a client computer, a request including a commitment generated using a message and a random value; determining that the client computer intends to encrypt the message based on the contents of the request; generating a partial computation based on a secret share and the commitment; generating a partial signature based on a verification share and the commitment; and transmitting the partial computation and the partial signature to the client computer, thereby enabling the client computer to: (1) generate a cryptographic key using the partial computation, (2) encrypt the message using the cryptographic key, thereby generating a ciphertext, (3) generate a verification signature using the partial signature, and (4) generate a payload comprising the ciphertext, the verification signature, and the commitment.

These and other embodiments of the disclosure are described in detail below. For example, other embodiments are directed to systems, devices, and computer readable media associated with methods described herein.

Prior to discussing specific embodiments of the invention, some terms may be described in detail.

Terms

A "server computer" may include a powerful computer or cluster of computers. For example, the server computer can include a large mainframe, a minicomputer cluster, or a group of servers functioning as a unit. In one example, the server computer can include a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic key" may include data used in encryption or decryption. For example, A cryptographic key may refer to a product of two large prime numbers. A cryptographic key may be used in a cryptosystem such as RSA (Rivest, Shamir, Adleman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

The term "plaintext" may refer to text that is in unencrypted or plain form. For example, this may refer to text that can be interpreted by a human or a computer without any processing, such as the phrase "hello, how are you?" Numbers or other symbols may also qualify as plaintext.

The term "ciphertext" may refer to text that is in an encrypted form. For example, this could refer to text that must be decrypted before it can be interpreted by a human or computer. Ciphertext may be generated using any cryptographic algorithm or cryptosystem, such as RSA or AES.

A "client computer" may refer to a computer that uses the services of other computers or devices, such as server computers. A client computer may connect to these other computers or devices over a network such as the Internet. As an example, a client computer may comprise a laptop computer that connects to an image hosting server in order to view images stored on that image hosting server.

A "cryptographic device" may refer to any device that may perform cryptographic operations, including encryption and decryption. A cryptographic device may participate in distributed or multi-party cryptography. Examples of cryptographic devices include server computers, hardware security modules, desktop computers, laptops, smartphones, smart watches, or other portable electronic devices. A cryptographic device may possess a "secret," or "secret share."

A "proxy device" may refer to a device that acts as a proxy. A proxy device may perform operations on behalf of other devices. For example, a proxy device may receive and transmit messages or other data on behalf of other devices. A proxy device that acts to route communications between other devices in a network of devices may be referred to as a "hub device."

The term "multi-party computation" may refer to a computation that is performed by multiple parties. Each party, such as a computer, server, or cryptographic device, may have some inputs to the computation. Each party can collectively calculate the output of the computation using the inputs.

The term "secure multi-party computation" may refer to a multi-party computation that is secure. In some cases, "secure multi-party computation refers to a multi-party computation in which the parties do not share information or other inputs with each other. An example is Yao's Millionaires' problem, in which two millionaires want to determine which one is more wealthy without revealing their wealth to one another.

A "secret value" or "secret" may refer to a value or thing kept hidden as part of a cryptographic process. The security of the cryptographic process may rely on the secret only being secret. A secret may include a cryptographic key or a "secret share." Exposure of the secret may allow parties other than the intended parties to encrypt or decrypt messages.

A "shared secret" may refer to a secret value or thing shared between multiple parties. For example, a shared secret may be a cryptographic key, divided up such that multiple parties each possess a fraction of that cryptographic key. As an example, two parties may each possess 64 bits of a shared secret comprising a 128 bit cryptographic key.

A "secret share" may refer to a value derived from a shared secret. As an example, a secret share may comprise the first 64 bits of a secret value. A secret share may also comprise a secret value combined with a number or other data. In some cases, multiple secret shares may be combined to reproduce a shared secret.

A "hash function" may refer to any function that can be used to map data of arbitrary length or size to data of fixed length or size. A hash function may be used to obscure data by replacing it with its corresponding "hash value." Hash functions may be used to generate "commitments" or "commitment messages" data that may be used to evaluate the integrity of encrypted data.

A "commitment" or "commitment message" may refer to data that may be used to verify that a course of action has been committed to. In the context of cryptography, a commitment may refer to a message that may be used to verify that an encrypted message was not tampered with. Before a message is encrypted, a commitment can be produced based on the message, e.g., via a hash function. This commitment can be sent alongside the encrypted message. Once the message is decrypted, the recipient can generate its own commitment message using the same hash function. The received commitment message and the generated commitment message can be compared to verify the integrity of the encrypted message.

A "pseudorandom function" may refer to a deterministic function that produces an output that appears random. Pseudorandom functions may include collision resistant hash functions and elliptic curve groups. A pseudorandom function may approximate a random oracle, an ideal cryptographic primitive that maps an input to a random output from its output domain. A pseudorandom function can be constructed from a pseudorandom number generator.

A "random nonce" or "cryptographic nonce" may refer to a random value (e.g., a random number) that may be used in a cryptographic process, preferably a limited number of times. A random nonce may be randomly or pseudorandomly generated, and may be used in conjunction with cryptographic hash functions. A random nonce may prevent some cryptographic attacks, such as the "replay attack."

A "non-interactive zero-knowledge proof of knowledge" may refer to a zero-knowledge proof of knowledge in which no interaction is necessary between a proving entity and a verifying entity. A "zero-knowledge proof of knowledge" is a method by which a proving entity can prove the knowledge of a secret for which a statement is true to a verifying entity, without revealing any additional information about the secret. A non-interactive zero-knowledge proof of knowledge may be used to verify the accuracy or performance of a computation.

A "verification value" may refer to data used to verify a computation, fact, or knowledge. An example of a verification value is a non-interactive zero-knowledge proof of knowledge, as discussed above. Another example of a verification value is a cryptographic key. As an example, a private cryptographic key may be used to verify the identity of the person or computer possessing that cryptographic key by signing or encrypting data using that private cryptographic key. A verification value comprising a cryptographic key may be referred to as a "verification key."

A "verification share" may refer to part of a verification value, or data derived from a verification value. A plurality of verification shares may be combined in some manner to produce the corresponding verification value. For example, the product of a collection of verification shares may be equal to the corresponding verification value.

A "signature," "digital signature," or "verification signature" may refer to data used to verify the authenticity of data using cryptography. A computer may digitally sign data by encrypting that data using a cryptographic key known only to that computer (i.e., a private key). Other computers may verify the signature by decrypting the data using a publically known cryptographic key corresponding to that computer (i.e., a public key). A verification signature may be used to verify either the source of the signed data or the veracity of the signed data.

A "partial signature" may refer to part of a digital signature. A partial signature, when combined with other partial signatures may reproduce the digital signature. For example, the exclusive-OR of a plurality of partial signatures may be used to reproduce the digital signature.

A "partial computation" may refer to part of a computation. Multiple partial computations may be combined to produce the output of the computation. For example, the volume of multiple solids may comprise partial computations of the total volume of those solids, and those partial computations may be combined via addition. Partial computations may be generated by multiple parties or cryptographic devices participating in a multi-party computation.

A "message" may refer to any data that may be transmitted between two entities. A message may comprise plaintext data or ciphertext data. A message may comprise alphanumeric sequences (e.g., "hello123") or any other data (e.g., image or video files). Messages may be transmitted between computers or other entities A "payload" may refer to information in a transmitted message. A payload may exclude automatically generated metadata. A payload may comprise multiple data elements. For example, a payload corresponding to human vital statistics may comprise three data values corresponding to the weight, height, and age of a human.

A "key generation seed" may refer to a value or other data used to generate a cryptographic key. For example, a key generation seed may be a number such as "12034024." A key generation seed may be used as the input to a random or pseudorandom function to generate the cryptographic key. Key generation functions may be consistent, that is, identical key generation seeds generate identical cryptographic keys.

DETAILED DESCRIPTION

Figure 1:
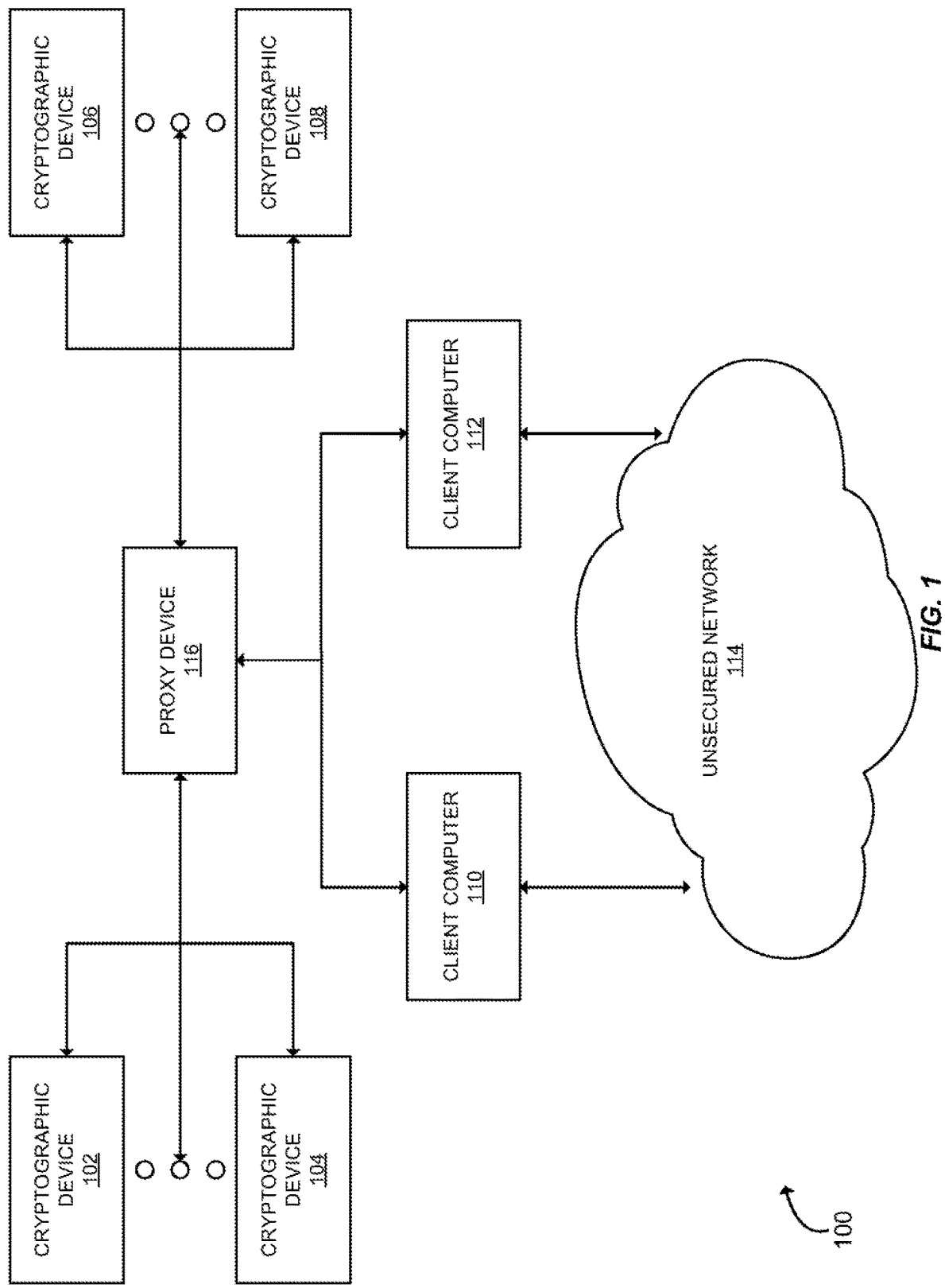
FIG. 1 shows a system block diagram of an exemplary distributed symmetric cryptography system according to some embodiments.

Some embodiments are directed to improvements to distributed symmetric cryptography, including both distributed symmetric encryption and distributed symmetric decryption as services.

A client computer and a plurality of cryptographic devices in a network of cryptographic devices can work together to encrypt a message or decrypt ciphertext. Not all cryptographic devices in the network of cryptographic devices necessarily need to participate, only a threshold number of cryptographic devices. For example, in a network of ten cryptographic devices, perhaps only seven cryptographic devices may need to participate.

During distributed symmetric encryption, the client computer can generate a commitment of a message to be encrypted. The commitment may comprise a hash of the message. The client computer can send the commitment to the participating cryptographic devices.

The cryptographic devices can store secret shares that are used for encryption or decryption, as well as store verification shares. The participating cryptographic devices can generate a plurality of partial computations using the commitment and their respective secret shares. These secret shares may correspond to a shared secret. A threshold number of these secret shares can be combined in some manner to reproduce the shared secret.

Likewise, the plurality of participating cryptographic devices can generate a plurality of partial signatures using the commitment and their respective verification shares. These verification shares may correspond to a verification value. A threshold number of these verification shares can be combined in some matter to reproduce the verification value. In some embodiments, the verification value may correspond to a verification key.

The participating cryptographic devices may transmit the plurality of partial computations and the plurality of partial signatures to the client computer. The client computer may use the plurality of partial computations to generate a cryptographic key and the plurality of partial signatures to generate a verification signature. The client computer can encrypt the message using the cryptographic key to produce a ciphertext.

To decrypt the message, a client computer (which may be same as computer system used for encryption) may transmit the commitment and the verification signature to an additional plurality of cryptographic devices. This additional plurality of cryptographic devices may comprise the same cryptographic devices used during distributed symmetric encryption or a different plurality of cryptographic devices that also store the respective secret and the verification key. The verification key may comprise a public key corresponding to the verification value, which may comprise a private key.

The additional plurality of cryptographic devices may verify the verification signature using the verification key. If the verification signature is legitimate, the additional plurality of cryptographic devices may generate an additional plurality of partial computations and transmit the additional plurality of partial computations to the client computer. The client computer may use the additional plurality of partial computations to generate a cryptographic key, then use the cryptographic key to decrypt the message. In these ways, the client computer and cryptographic devices may perform distributed symmetric cryptography.

Some embodiments are described in more detail below with reference to the figures. Concepts such as secret sharing and distributed pseudorandom functions are described in Section I. An exemplary distributed cryptographic network is described in Section II with reference to FIG. 1. An exemplary client computer is described in Section II with reference to FIG. 2. An exemplary cryptographic device is described in Section II with reference to FIG. 3. Exemplary systems and methods for secret share distribution are described in Section III with reference to FIGS. 4 and 5. Methods of distributed symmetric cryptography (without verification signatures) are described in Sections IV and V with reference to FIGS. 6 and 7. Methods of improved distributed symmetric cryptography (i.e., with verification signatures) are described in Sections VI and VII with reference to FIGS. 8 and 9. A computer system is described in Section VIII with reference to FIG. 10.

I. Distributed Symmetric Cryptography Overview

Some embodiments may make use of secret sharing, pseudorandom functions, and distributed pseudorandom functions in order to implement distributed symmetric cryptography. These concepts are described in more detail below.

A. Secret Shares and Verification Shares

As stated above, secret shares may be derived from a shared secret. The shared secret or the secret shares may be used in order to perform cryptographic operations. For example, a shared secret or secret shares may be used to generate a cryptographic key. Secret shares may be combined in some manner in order to reproduce the shared secret from which those secret shares were derived. Using secret shares may be preferable to using a non-shared secret in some cryptographic applications, because a malicious user must steal multiple secret shares in order to reproduce and obtain the shared secret. By contrast, in a non-distributed cryptosystem, the malicious user only needs to steal one secret value in order to obtain it.

Verification shares can be similar to secret shares. Verification shares may correspond to a verification value, similar to how secret shares correspond to a shared secret. Verification shares may be combined in some manner to reproduce a verification value. In some embodiments, methods used to generate, distribute, or combine verification shares may also be used to generate, distribute or combine verification shares.

Verification shares may be used to produce a verification signature, which may be used to verify distributed symmetric cryptographic operations. As an example, in some embodiments, cryptographic devices verify a verification signature during distributed symmetric decryption. The presence of the verification signature indicates to the cryptographic devices that the client computer is performing a decryption operation.

Secret shares and verification shares may possess some useful optional properties. One such property is the "t-out-of-n" property. This property indicates that t secret shares or verification shares out of a total of n secret shares or verification shares are sufficient to reproduce the shared secret or verification value. Moreover, it may not matter which secret shares or verification shares are used to reproduce the shared secret, only that at least t secret shares or verification shares are used.

There are many techniques that can be used to implement secret sharing, particular t-out-of-n secret sharing. Shamir's secret sharing scheme is one non-limiting example discussed below. However, other appropriate secret sharing techniques are equally applicable.

Generally, Shamir's secret sharing involves encoding a shared secret (or alternatively, a verification value) into the coefficients of a polynomial $P(x)=a_0+a_1x+a_2x^2+\ldots+a_kx^k$. The secret shares or verification shares can comprise distinct points (paired x, P(x) values) on the polynomial. The shared secret or verification value can be obtained from the secret shares or verification shares by interpolating the polynomial using the secret shares or verification shares. Lagrange interpolation is one method that can be used.

A polynomial of degree k can comprise k+1 coefficients $a_0, a_1, \ldots, a_k$. While the shared secret or verification value can be encoded into any coefficient, it is sometimes preferable to encode the shared secret or verification value into the zeroth order coefficient $a_0$. The shared secret or verification value can be encoded into the zeroth order coefficient $a_0$ by converting the shared secret or verification value into a number, then using that number as $a_0$. The value of the other coefficients $a_1, a_2, \ldots, a_k$ may be selected in any appropriate manner (e.g., randomly). If the shared secret S is encoded into the zeroth order coefficient $a_0$, the polynomial evaluated at x=0 is equal to the shared secret i.e., $P(0)=a_0=S$.

Shamir's secret sharing using the fact that k+1 unique points are needed to uniquely define a polynomial of degree k. k+1 is the minimum or threshold number of points needed to interpolate the polynomial and determine the shared secret or verification value. Thus k+1 may be referred to as a threshold number t. This property enables "threshold authenticated cryptography." When secret shares are distributed to a plurality of cryptographic devices (e.g., one secret share per cryptographic device), and those cryptographic devices participate in a distributed cryptographic operation, at least a threshold number of those cryptographic devices must participate in order to reach the threshold number of secret shares.

Further, because the secret shares (or verification shares) comprise points on a polynomial (of which there are infinite), Shamir's secret sharing can provide for an arbitrarily large number of secret shares for any given threshold. This means that networks of cryptographic devices can possess an arbitrarily large number of cryptographic devices for any given threshold.

A polynomial P(x), and consequently the shared secret (or verification value) S can be determined using Lagrange interpolation, which can be used to relate secret shares or verification shares comprising paired $(x_j, P(x_j))$ values to the polynomial P(x). The pair $(x_j, P(x_j))$ corresponds to the $j^{th}$ secret share. The Lagrange form of a polynomial is given by the following formula:

$$P(x)=\Sigma_{j=0}^{k} P(x_j) l_j(x) \quad (1)$$

Where $l_j(x)$ is the $j^{th}$ Lagrange basis polynomial (i.e., corresponding to the $j^{th}$ secret share). The Lagrange basis polynomial $l_j(x)$ is defined by the following formula:

$$l_j(x) = \prod_{\substack{0 \le p \le k \\ p \ne j}} \frac{x - x_p}{x_j - x_p} \quad (2)$$

Where $x_j$ is the x value corresponding to the $j^{th}$ secret share (or verification value) and $x_p$ is the x value of the $p^{th}$ secret share (or verification value).

Because the zeroth order coefficient $a_0$ equals P(0) when the shared secret or verification value S is encoded as the zeroth order coefficient $a_0$, the preceding formulas can be simplified by substituting x=0:

$$l_j := \prod_{\substack{0 \le p \le k \\ p \ne j}} \frac{-x_p}{x_j - x_p} \quad (3)$$

$$S = a_0 = \sum_{j=0}^{k} P(x_j) l_j \quad (4)$$

Shamir's secret sharing can be used to distribute secret shares or verification values to a number of cryptographic devices. These secret shares or verification shares may comprise unique points given as paired values $(x_j, P(x_j))$. Using a threshold number of these secret shares or verification values, the Lagrange coefficients $l_j$ can be calculated and used along with the values $P(x_j)$ to determine the shared secret (or verification value) S, as shown above.

Notably the shared secret or verification value can be reconstructed regardless of which secret shares or verification shares are used. Thus different cryptographic devices can participate in the distributed cryptographic operation each time and still produce the same shared secret or verification value. However, it is sometimes preferable to produce a value derived from either the shared secret or verification value, rather than the shared secret or verification value itself. This can be accomplished using distributed pseudorandom functions, as described below.

B. Pseudorandom and Distributed Pseudorandom Functions

A pseudorandom function is a function that produces an output where the relationship between the input and the output appears random. The advantage of using pseudorandom functions is that it is difficult to determine the input given the output, and thus pseudorandom functions can be used to obscure inputs.

In a hypothetical cryptographic application, a shared secret S could comprise a cryptographic key. The shared secret S could be used to encrypt or decrypt data, when and if it is reconstructed from its constituent secret shares $s_0, s_1, \ldots, s_t$. However, this may be undesirable, because after the shared secret is reconstructed, the shared secret could be stolen and used by a malicious participant (e.g., a malicious client computer or malicious cryptographic device). Instead, it may be preferable to use the shared secret as an input to a pseudorandom function, then use the output of the pseudorandom function as a cryptographic key, or use the output of the pseudorandom function to generate a cryptographic key. In this way the shared secret S is not exposed.

A distributed pseudorandom function may refer to a pseudorandom function that can be calculated in a distributed manner. As an example, a plurality of cryptographic devices may calculate a plurality of partial computations. These partial computations may be combined to produce the output of a pseudorandom function. The combination of those partial combinations may be equivalent to the output of a corresponding non-distributed pseudorandom function.

Any pseudorandom function that appears random and is consistent can be used as the basis for a distributed pseudorandom function. Notable examples of pseudorandom functions are hash functions and cryptosystems such as the advanced encryption standard (AES) cryptosystem and elliptic curve cryptosystems. Elliptic curve cryptography will be described below for the purpose of illustrating some embodiments, however, it should be understood that embodiments can be practiced with any appropriate pseudorandom function.

An elliptic curve is any curve satisfying the equation $y^2=x^3+ax+b$. Elliptic curve cryptography is usually performed using elliptic curves over finite fields. An example of a finite field is integers mod p, where p is a prime number. An elliptic curve group may be defined by its order q, the number of elements within the group. The decisional Diffie-Hellman assumption holds under these elliptic curve groups.

Elliptic curve cryptosystems, like many other cryptosystems, relies on mathematical problems which have computationally infeasible solutions. With elliptic curve cryptography, there is currently no efficient solution to the "elliptic curve discrete logarithm problem." Given an original point A on an elliptic curve and a product point C on an elliptic curve, it is sufficiently difficult to determine a multiplicand B, such that the point multiplication A*B=C holds. A practical result is that as long as B is kept hidden, a message can be converted into a point A and point-multiplied with a point B in order to produce a product point C.

The decisional Diffie-Hellman assumption states that in a multiplicative group G of prime order p with generator g, that for random and independent a and b, the values $g^a$, $g^b$ and $g^{ab}$ all appear to be random elements selected from the group G. In other words, it is difficult to determine the multiplicative relationship between $g^a$, $g^b$ and $g^{ab}$ (i.e., that $g^{ab}$ equals the product of $g^a$ and $g^b$).

Practically, two points on an elliptic curve can be multiplied to produce a third point, and the relationship between the two points and the third point appears random. So if some value can be represented as a point, that value can be point multiplied by another value to produce a third value, and the relationship between those three values appears random. Thus elliptic curves can be used as a pseudorandom functional basis for distributed pseudorandom functions.

C. Applications

In some embodiments, elliptic curve cryptography can be used to encrypt a commitment H(m) (i.e., a hash value corresponding to an input message m) using a plurality of secret shares. These encrypted commitments may be referred to as partial computations. As shown below, the partial computations can be combined to produce a value that is equivalent to the commitment H(m) encrypted using the shared secret S, demonstrating that elliptic curve cryptography can be used as a distributed pseudorandom function.

The term $H(m)^s$ may be used to represent the commitment H(m) encrypted using shared secret S using elliptic curve cryptography. The term $H(m)^{s_i}$ may be used to represent the partial computation comprising the commitment H(m) encrypted using the secret share $s_i$. In elliptic curve cryptography, these encryptions are equivalent to point multiplying the commitment H(m) by itself S or $s_i$ times.

The relationship between $H(m)^s$ and $H(m)^{s_i}$ can be shown using formula (4):

$$H(m)^s = H(m)^{\sum_{i=1}^{t} s_i \lambda_i} = \prod_{i=1}^{t} (H(m)^{s_i})^{\lambda_i}$$

Where $s_i$ is the $i^{th}$ secret share and $\lambda_i$ is the $i^{th}$ Lagrange coefficient corresponding to $s_i$ (see formula (3)). Thus, the commitment encrypted using the shared secret S (i.e., $H(m)^S$) is equal to the product of the commitments encrypted using the secret shares and exponentiated using the Lagrange coefficients $(H(m)^{s_i})^{\lambda_i}$. This illustrates one way in which Shamir's secret sharing and elliptic curve cryptography can be used together to implement distributed pseudorandom functionality. In some embodiments, the output of the distributed pseudorandom function can be used to generate a cryptographic key (e.g., as a key generation seed, using a key generation function) that can be used for encryption and decryption. Provided that a consistent commitment H(m) is used, the cryptographic key will be consistent, thus the same cryptographic key can be generated and used for encrypting messages and decrypting corresponding ciphertext.

To summarize in context of some embodiments, each cryptographic device can possess a secret share $s_i$. A threshold number of cryptographic devices can participate in a multi-party cryptographic operation. A client computer may possess a message m that the client computer wants to encrypt. The client computer may generate a commitment of the message H(m), and transmit the commitment to the participating cryptographic devices. The participating cryptographic devices may each use their corresponding secret share $s_i$ to encrypt the commitment m, generating a plurality of partial computations $H(m)^{s_i}$ in the process. The participating cryptographic devices may transmit the plurality of partial computations $H(m)^{s_i}$ to the client computer. The client computer may determine Lagrange coefficients $\lambda_i$ corresponding to the plurality of partial computations $H(m)^{s_i}$. The client computer may exponentiate the plurality of partial computations with their corresponding Lagrange coefficients $\lambda_i$ to produce a plurality of intermediate computations. The client computer may combine the intermediate computations by calculating their product. The product of the intermediate calculations may be equivalent to the commitment H(m) encrypted using the shared secret S (i.e., $H(m)^S$). The product of the intermediate calculations may be used as a key generation seed in order to generate a cryptographic key. The cryptographic key may be used to encrypt the client computer's message and produce a ciphertext. When the ciphertext is to be decrypted, the same process may occur and the same cryptographic key may result. The ciphertext may be decrypted with the cryptographic key, generating the message m.

In some embodiments, verification signatures can be produced using similar methods. A client computer may transmit a commitment H(m) of a message m to a plurality of cryptographic devices, The plurality of cryptographic devices may use elliptic curve cryptography to encrypt the commitment H(m) using each of their respective verification shares to produce a plurality of partial signatures. The plurality of cryptographic devices may transmit the plurality of partial signatures to the client computer. The client computer may determine a plurality of Lagrange coefficients $\lambda_i$ corresponding to the plurality of partial signatures, then exponentiate each partial signature using its corresponding Lagrange coefficient to produce a plurality of intermediate signatures. The client computer may generate a verification signature as the product of the plurality of intermediate signatures. The verification signature may be equivalent to the commitment H(m) encrypted using the verification value.

The verification value and a verification key may comprise an asymmetric cryptographic key pair. That is, the verification value may comprise a secret or private cryptographic key, and the verification key may comprise a public cryptographic key, or vis versa. To verify a verification signature, a cryptographic device may decrypt the verification signature using the verification key to produce the commitment H(m), if the commitment H(m) matches a commitment received from the client computer, the verification signature is legitimate.

The preceding example was intended as one non-limiting example of how shared secrets and distributed pseudorandom function may be used to perform distributed symmetric cryptography according to some embodiments. Embodiments may use any appropriate pseudorandom function (such as AES, hash functions, etc.) as well as any appropriate secret sharing techniques (e.g., Blakley's scheme, the Chinese Remainder Theorem, etc.).

II. Distributed Cryptographic Network

A. System Block Diagram

FIG. 1 shows a system block diagram of an exemplary distributed cryptography network 100 according to some embodiments. The exemplary distributed cryptography network may comprise cryptographic devices 102-108, client computers 110 and 112, unsecured network 114, and optionally proxy device 116.

Although only four cryptographic devices 102-108 are shown, embodiments can be practiced with any number of cryptographic devices. Likewise, although only two client computers 110 and 112 are shown, embodiments can be practiced with any number of client computers.

The computers and devices of FIG. 1 may communicated with each other via a communication network, which can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like; and/or the like. Messages between the computers and devices may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like.

The distributed cryptography network may enable client computers 110 and 112 to encrypt messages or decrypt ciphertext using cryptographic materials (secret shares) securely stored by cryptographic devices 102-108. Client computers 110 and 112 may communicate with cryptographic devices 102-108 either directly, via a network (such as the Internet or unsecured network 114) or via an optional proxy device 116. The client computers 110-112 may possess messages to be encrypted ("plaintext messages" or "plaintext") or decrypted ("ciphertext messages" or "ciphertext"), as well as hardware, software, code, or instructions that enable client computers 110-112 to participate in distributed symmetric cryptographic processes.

Each cryptographic device 102-108 may possess a secret share and a verification share. The secret shares and verification shares may be derived from a shared secret and a verification value. The shared secret and verification value may be shared among the cryptographic devices 102-108, e.g., there may be a single shared secret and verification value from which the secret shares and verification shares are derived. The verification value correspond to a verification key that can be used by cryptographic devices 102-108 to verify verification signatures produced using verification shares. A threshold number of secret shares may allow the reconstruction of the shared secret, and a threshold number of the verification shares may allow the reconstruction of the verification value. The threshold number may be less than the total number of cryptographic devices 102-108. For example, if there are twenty cryptographic devices 102-108, the threshold number may be 14 cryptographic devices, or any other appropriate number of cryptographic devices.

The cryptographic devices 102-108 may be organized into a cryptographic device network. This cryptographic device network may comprise a local area network connected to a larger computer network, such as the Internet or unsecured network 114. Communications between the cryptographic device network and external computers (e.g., client computers 110 and 112) may be mediated by the proxy device 116, which may comprise a web server that communicates with client computers 110 and 112 via any appropriate means (e.g., an Application Programming Interface API).

A cryptographic device network may be organized into any appropriate networking structure. For example, a cryptographic device network may comprise a "chain" structure, whereby the cryptographic devices are organized into a linear sequence of cryptographic devices. Communications from a client computer 110 to one cryptographic device (e.g., cryptographic device 108) may pass through all the preceding cryptographic devices (e.g., cryptographic device 102-106) and proxy device 116 before reaching the cryptographic device. Alternatively, the cryptographic device network may comprise a "tree" structure, with different branches comprising different collections of cryptographic devices (e.g., one branch may comprise cryptographic devices 102 and 104, and another branch may comprise cryptographic devices 106 and 108). A cryptographic device network may comprise any number of proxy devices, which may act as proxies to cryptographic devices or other proxy devices.

Unsecured network 114 may comprise a computer network over which client computers 110 and 112 communicate with one another. Unsecured network 114 may comprise a network such as the Internet. A client computer such as client computer 110 may communicate with cryptographic devices 102-108 in order to encrypt a message, such that the encrypted message can be securely transmitted to client computer 112 via unsecured network 114. Client computer 112 can then communicate with cryptographic devices 102-108 in order to decrypt the message.

As an example, client computers 110 and 112 may comprise medical record systems in different hospitals. These hospitals may not be equipped to encrypt medical records on their own. As such, in order to comply with patient confidentiality rules, these hospitals may use their respective client computers 110 or 112 and cryptographic devices 102-108 to encrypt medical records before storing them in a medical record database. When a medical record needs to be decrypted (i.e., prior to a meeting between a doctor and the patient corresponding to that medical record), client computer 110 or 112 can communicate with cryptographic devices 102-108 in order to decrypt the medical record. As another example, if a patient is being transferred from the first hospital to the second hospital, the client computer corresponding to the first hospital (e.g., client computer 110) can transmit the encrypted medical record to the client computer corresponding to the second hospital (e.g., client computer 112). The client computer corresponding to the second hospital can decrypt the medical record using by communicating with cryptographic devices 102-108, or a different set of cryptographic devices that are provisioned using the same master key.

An exemplary client computer is described in more detail below with reference to FIG. 2.

B. Client Computer

As described above, a client computer may comprise a computer system that communicates with a distributed symmetric cryptography system (e.g., a cryptographic device network) in order to encrypt messages or decrypt ciphertext. A client computer may comprise a personal computer or a communication device associated with a user. These devices may include, for example, laptops, desktop computers, smartphones, tablets, smart watches, PDAs, etc. A client computer may also comprise a server computer or mainframe computer associated with an organization (e.g., a business).

Figure 2:
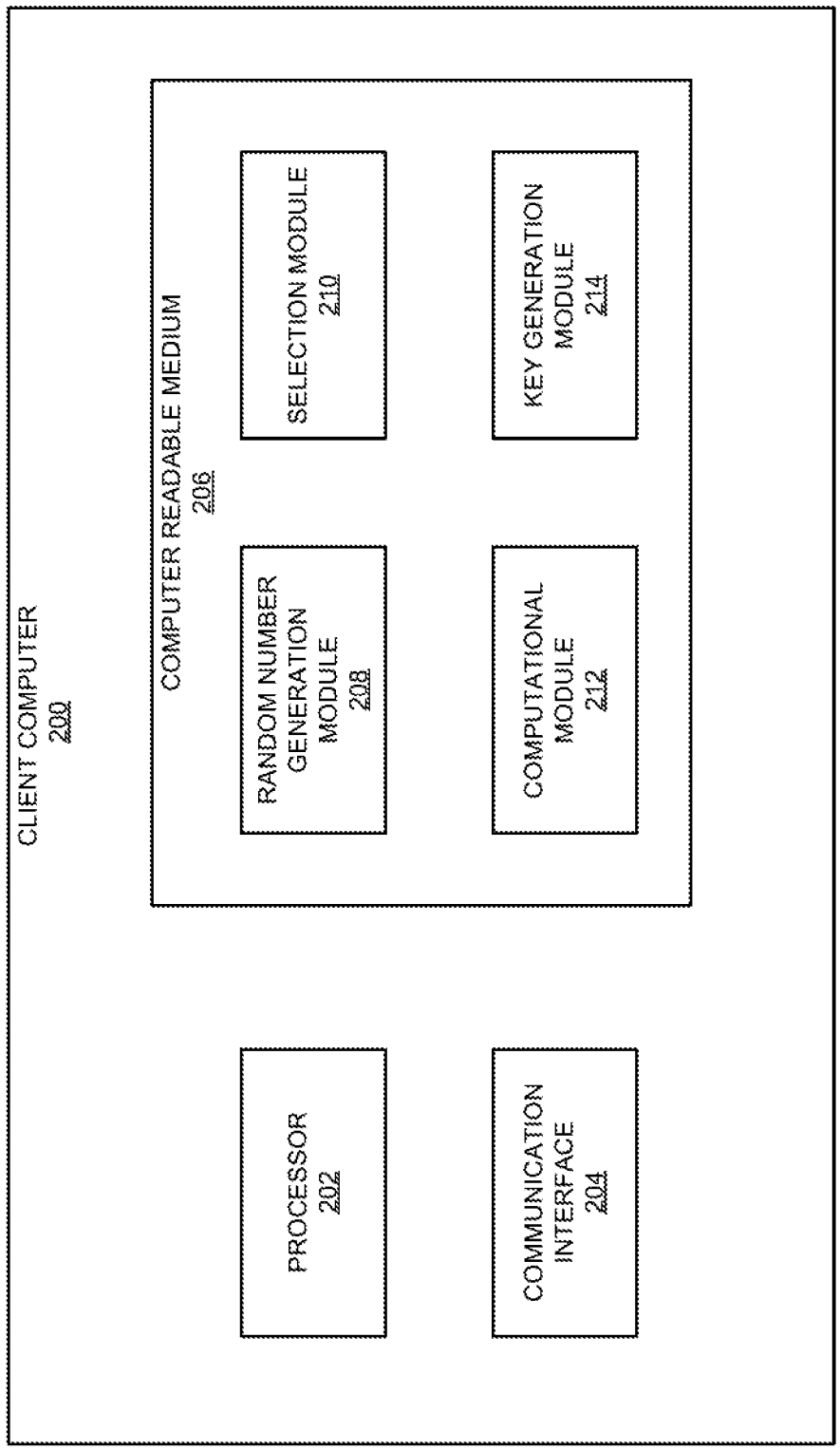
FIG. 2 shows a system block diagram of an exemplary client computer according to some embodiments.

An exemplary client computer 200 is shown in FIG. 2. Client computer 200 may comprise a processor 202, a communication interface 204, and a computer readable medium 206.

1. Processing, Communicating, and Storing

Processor 202 may comprise any suitable data computation device or devices. Processor 202 may be able to interpret code and carry out instructions stored on computer readable medium 206. Processor 202 may comprise a central processing unit (CPU) operating on a reduced instructional set, and may comprise a single or multi-core processor. Processor 202 may include an arithmetic logic unit (ALU) and a cache memory, these components may be used by processor 202 in executing code or other functions.

Communication interface 204 may comprise any interface by which client computer 200 may communicate with other computers or devices. Examples of communication interfaces include wired interfaces, such as USB, Ethernet, or FireWire. Examples also include interfaces used for wireless communication, such as a Bluetooth or Wi-Fi receiver. Client computer 200 may possess multiple communication interfaces 204. As an example, a client computer 200 comprising a smartphone may communicate through a micro USB port, a cellular receiver, a Bluetooth receiver, and a Wi-Fi receiver.

Client computer 200 may communicate with other devices or computers, using communication interface 204 via one or more secure and authenticated point-to-point channels. These channels may use standard public-key infrastructure. For example, client computer 200 and a cryptographic device may exchange a symmetric key and/or key shares via their communication interfaces. This key exchange may comprise a Diffie-Hellman key exchange. After exchanging cryptographic keys, client computer 200 and the cryptographic devices may communicate over a public channel (such as an unsecured network) using a standard authenticated encryption scheme to encrypt any message with the cryptographic key. Further authentication methods can also be used, e.g., digital signatures.

Computer readable medium 206 may comprise hardware that may possess code, data, or instructions that can be interpreted by processor 202. Computer readable medium 206 may store or otherwise comprise a number of software modules, including a random number generation module 208, a selection module 210, a computational module 212, and a key generation module 214.

2. Random Number Generation Module

Random number generation module 208 may comprise or include code, instructions, routines, subroutines, etc., that may be used by processor 202 to generate random or pseudorandom numbers. These random number may include cryptographically secure pseudorandom numbers, and the code may comprise one or more pseudorandom number generation algorithms that meet the requirements for cryptographic security. These requirements, may include, for example, passing the "next bit test" and passing a "state compromise extension test." Examples of cryptographically secure random number generators include the Yarrow, ChaCha20, and Fortuna algorithms, among others.

Random number generation module 208 may communicate with other modules or hardware in client computer 200 for the purpose of generating random or pseudorandom numbers. As an example, pseudorandom number generation module 208 may retrieve the system time (e.g., current year, month, day hour, etc.) in order to seed a pseudorandom number generation algorithm.

Random or pseudorandom numbers may be used to "blind" (i.e., obscure) messages for the purpose of encryption or generating commitments. A message may be combined in some manner with a random or pseudorandom number in order to obscure the message. As an example, a message "hello" may be concatenated with a random number 12345 to produce the blinded message "hello12345." Alternatively, the bitwise exclusive-OR (XOR) may be used to blind a message using a random number. By blinding messages with random numbers, client computer 200 may protect itself against some cryptographic attacks, including replay attacks. Accordingly, rather than generating a commitment H(m) based solely on a message m, client computer 200 may generate a commitment based on a message and a random value (or random nonce). Additionally, instead of encrypting a message m, client computer 200 may encrypt the message m and the random value.

3. Selection Module

Selection module 210 may comprise code or instructions used by processor 202 for selecting a threshold number of cryptographic devices from cryptographic devices in the cryptographic device network. The threshold number of cryptographic devices may comprise the number of cryptographic devices necessary to reproduce a shared secret or verification value from secret shares and verification shares stored on those cryptographic devices. In some embodiments, client computer 200 may not select cryptographic devices from cryptographic devices in the cryptographic device network. Instead, client computer 200 may communicate with a proxy device and the proxy device may perform the selection process. As such, selection module 210 may be optional.

As an example, selection module 210 may comprise code implementing a random selection algorithm. The selection module 210 could include a list of cryptographic devices in the cryptographic device network. The selection module 210 could select, without replacement, from the list until a threshold number of cryptographic devices are selected. Alternatively, selection module 210 may comprise code that enables rule-based cryptographic device selection. For example, the selection module 210 may determine a threat score associated with each cryptographic device. The threat scores may correspond to a likelihood that a given cryptographic device has been compromised by a hacker or malicious user. The selection module 210 may select a threshold number of cryptographic devices with the lowest threat scores, or randomly select from cryptographic devices with a threat score under a certain value.

As another alternative, the selection module 210 may comprise code enabling the selection of cryptographic devices based on computational load. Some cryptographic devices in the cryptographic device network may already be performing distributed symmetric cryptography on behalf of other client computers, and as a result, may have a higher computational load. The client computer 200 may use selection module 210 in order to select a threshold number of cryptographic devices with a lower computational load in order to improve the turn-around time and throughput of the distributed symmetric cryptography system.

4. Computational Module

Computational module 212 may comprise code or instructions that enable processor 202 to perform various computations involved in distributed symmetric cryptography. These may include, for example, generating commitments based on messages and random values, combining partial computations, and combining partial signatures.

Computational module 212 may comprise code enabling the generation of commitments using any appropriate function or algorithm. As an example, computational module 212 may comprise a hash function (e.g., secure hashing algorithm SHA-256, SHA3, BLAKE2, etc.) that can be used to generate commitments. Messages and random values can be provided as an input to the hash function, and the resulting hash value may be used as the commitment. As stated above, a commitment can be used to verify that a message was encrypted and decrypted correctly. A commitment can be produced based on a message before that message is encrypted. After that message is encrypted and subsequently decrypted, another commitment can be produced based on the decrypted message. Provided that the decrypted message is the same as the original message, the commitments for both messages should be identical.

Computational module 212 may comprise code enabling the combination of partial computations and partial signatures using any appropriate methods, functions, or algorithms. As on example, partial computations may be combined by calculating the sum or product of the partial computations. Computational module 212 may also comprise code enabling polynomial interpolation, such as the calculation of Lagrange coefficients. These Lagrange coefficients may correspond to partial computations. Additionally, computational module 212 may comprise code enabling exponentiation and modular exponentiation.

For example, client computer 200 may use computational module 212 to calculate a plurality of Lagrange coefficients corresponding to a plurality of partial computations. Client computer 200 may then use computational module 212 to exponentiate those partial computations using the plurality of Lagrange coefficients in order to generate a plurality of intermediate computations. Client computer 200 may calculate the product of those intermediate computations. The product of the intermediate computations may be used as a key generation seed. Client computer 200 can use computation module 212 to input this key generation seed into a key generation algorithm in order to produce a cryptographic key that can be used to encrypt or decrypt a message.

Likewise, computation module 212 may comprise code enabling the client computer 200 to generate verification signatures from partial signatures, using techniques similar to the techniques used to generate the key generation seed (e.g., interpolation using Lagrange polynomials, and the like).

5. Key Generation Module

Key generation module 214 may comprise code or instructions enabling processor 202 to generate cryptographic keys. These cryptographic keys may be generated from key generation seeds. Key generation depends on the particular cryptosystem being used to perform cryptography. For example, for an "AES-128-CBC" cryptosystem (an AES block cipher with a 128 bit key operating in cipher block chaining mode), a key generation algorithm may accept a passphrase or key generation seed as an input and produce a 128 bit key for an AES block cipher.

Client computer 200 may use key generation module 214 to generate cryptographic keys used to encrypt messages or decrypt ciphertext. The key generation seed used as an input to key generation module 214 may be derived, wholly or in part, from partial computations received from cryptographic devices. The key generation seed may comprise a product of intermediate computations generated by exponentiating partial computations using their corresponding Lagrange coefficients. These partial computations may be generated by the cryptographic devices using a commitment received from the client computer and secret shares, as described above in Section I. Thus, the key generation seed and the cryptographic key may be derived indirectly from the secret shares, as the secret shares are used to generate the partial computations that are used to generate the intermediate computations, which can in turn be combined and used as the key generation seed.

C. Cryptographic Device

Figure 3:
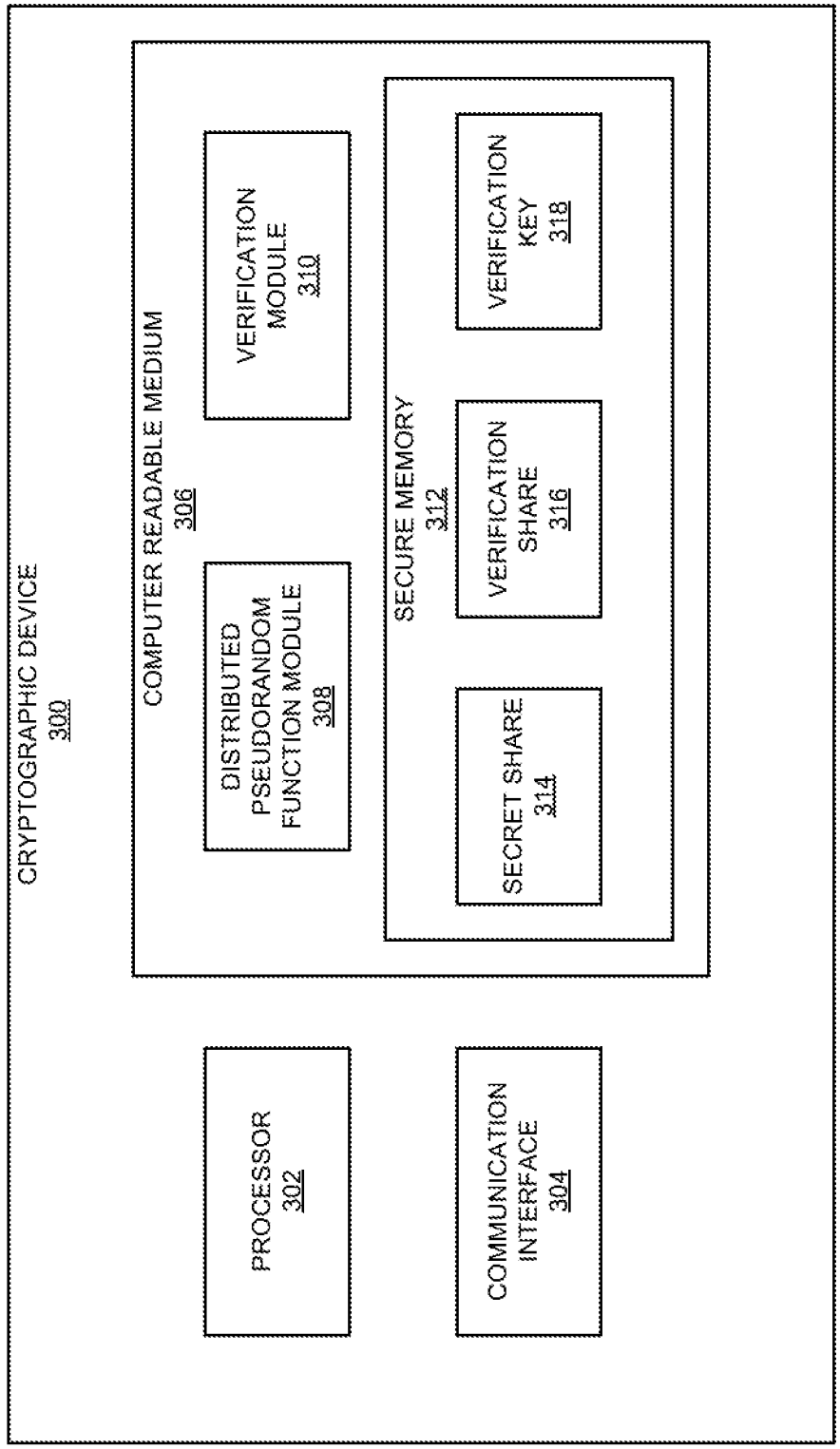
FIG. 3 shows a system block diagram of an exemplary cryptographic device according to some embodiments.

FIG. 3 displays an exemplary cryptographic device 300 according to some embodiments. The cryptographic device 300 may comprise a computer or other device in a cryptographic device network. In some embodiments, cryptographic device 300 may comprise a server computer. Cryptographic device 300 may store a secret share and verification share, derived from a shared secret and a verification value respectively. Additionally, cryptographic device 300 may store a verification key used to verify a verification signature. The shared secrets and verification shares may be used by the cryptographic device to generate partial computations and partial signatures using a distributed pseudorandom function. The partial computations may be used by a client computer to generate a cryptographic key. The cryptographic key can be used by the client computer to encrypt or decrypt messages. Cryptographic device 300 may comprise a processor 302, a communication interface 304, and a computer readable medium 306.

1. Processing, Communicating, and Storing

Processor 302 may comprise any suitable data computation device or devices. Processor 302 may be able to interpret code and carry out instructions stored on computer readable medium 306. Processor 302 may comprise a central processing unit (CPU) operating on a reduced instructional set, and may comprise a single or multi-core processor. Processor 302 may include an arithmetic logic unit (ALU) and a cache memory. These components may be used by processor 302 in executing code or other functions.

Communications interface 304 may comprise any interface by which cryptographic device 300 may communicate with other computers or devices. Examples of communication interfaces include wired interfaces, such as USB, Ethernet, or FireWire. Examples also include interfaces used for wireless communication, such as a Bluetooth or Wi-Fi receiver. Cryptographic device 300 may possess multiple communication interfaces 304, such as a micro USB port, an Ethernet port, a cellular receiver, a Bluetooth receiver, etc.

Cryptographic device 300 may communicate with other devices or computers using communication interface 304 via one or more secure and authenticated point-to-point channels. These channels may use standard public-key infrastructure. For example, cryptographic device 300 and a client computer may exchange a symmetric key via their communication interfaces. This key exchange may comprise a Diffie-Hellman key exchange. After exchanging cryptographic keys, cryptographic device 300 and the client computer may communicate over a public channel (such as an unsecured network) using a standard authenticated encryption scheme to encrypt any message with the cryptographic key. Further authentication methods can also be used, e.g., digital signatures. By performing this key exchange, communications between cryptographic device 300 and a client computer client computer (e.g., commitments, partial computations, partial signatures, verification signatures, etc.) may be encrypted, allowing cryptographic device 300 and the client computer to communicate securely over an unsecured network.

Computer readable medium 306 may comprise hardware that may possess or store code, data or instructions that can be interpreted by processor 302. Computer readable medium 306 may store or otherwise comprise a number of software modules, including a distributed pseudorandom function module 308, a verification module 310, and a secure memory element 312. The secure memory element may store a secret share 314, a verification share 316, and a verification key 318.

2. Distributed Pseudorandom Function Module

The distributed pseudorandom function module 308 may comprise code for the purpose of evaluating pseudorandom functions (PRFs) or distributed pseudorandom functions (DPRFs). This may include, for example, performing cryptographic operations associated with elliptic curve cryptography, block ciphers such as AES, or hash functions such as SHA-2.

As an example, the distributed pseudorandom function module 308 may comprise code that may be used by processor 302 in order to implement elliptic curve cryptography under the decisional Diffie-Hellman assumption. Elliptic curve cryptography may be used to generate partial computations based on a commitment and secret share 314. These partial computations may be later combined by a client computer to produce a cryptographic key that can be used to encrypt a message or decrypt ciphertext, for example, as described above in Section I.

Thus processor 302 may use the distributed pseudorandom function module 308 in order to perform elliptic curve cryptography using a commitment H(m) of a message m as an input. The commitment may be converted to a point in an elliptic curve group, which may then be point multiplied by a secret multiplicand (e.g., secret share 314) to produce a product point. The product point may comprise a partial computation that may be then transmitted by the cryptographic device 300 to a client computer. Given the same commitment input and the same secret share 314, the resulting partial computation will be the same, enabling the partial computation to be used to generate consistent encryption and decryption keys.

3. Verification Module

Verification module 310 may comprise code or instructions, executable by processor 302 for generating partial signatures and verifying verification signatures. As stated above, verification signatures may be used by cryptographic device 300 to determine whether a client computer is encrypting data or decrypting data. The presence of a valid verification signature may indicate that the client computer is decrypting data, as the cryptographic device 300 may verify the verification signature during distributed symmetric decryption.

Verification module 310 may use a verification share (stored, for example, insecure memory 312) in order to generate a partial signature from a commitment received from a client computer. The cryptographic device 300 may transmit the partial signature to the client computer, which may also receive a number of other partial signatures from other cryptographic devices. The client computer may combine these partial signatures to generate a verification signature, which the client computer may transmit to cryptographic device 300. Cryptographic device 300 may then use the verification module 310 to verify the verification signature, using a verification key. Verification module 310 may generate the partial signature by encrypting the commitment using its corresponding verification share and elliptic curve cryptography. Alternatively, verification module 310 may generate the partial signature by encrypting the commitment using its corresponding verification share and any appropriate form of homomorphic cryptography. As another alternative, verification module 310 may generate the partial signature using the commitment, the verification share, and an appropriate message authentication code algorithm.

Verification module 310 may use verification key 318 for the purpose of verifying verification signatures. Verification key 318 may correspond to a verification value that can be derived from verification share 316 and other verification shares belonging to other cryptographic devices. In some embodiments, verification key 318 and the verification value may comprise an asymmetric key pair. As an example, verification key 318 may comprise a public cryptographic key, and the verification value may comprise a private cryptographic key.

A verification signature may comprise a commitment H(m) encrypted using the verification value. The verification signature may be decrypted using verification key 318 to produce the commitment H(m). Cryptographic device 300 may use verification module 310 in order to decrypt the verification signature using verification key 318 and compare the resulting commitment to a commitment received from a client computer. If the two commitments match, the verification signature is legitimate. However, cryptographic device 300 may use verification module 310 to verify a verification signature using any other appropriate method, such as a method based off pairing friendly elliptic curves, message authentication codes (MACs), hashed message authentication codes (HMACs) etc. Example techniques for verifying signatures can be found in: [1] Boldyreva A. (2003) "Threshold Signatures, Multisignatures and Blind Signatures Based on the Gap-Diffie-Hellman-Group Signature Scheme." In: Desmedt Y. G. (eds) Public Key Cryptography—PKC 2003. PKC 2003. Lecture Notes in Computer Science, vol 2567. Springer, Berlin, Heidelberg; [2] Victor Shoup. 2000. "Practical threshold signatures." In Proceedings of the 19th international conference on Theory and application of cryptographic techniques (EUROCRYPT '00). Springer-Verlag, Berlin, Heidelberg, 207-220; and [3] Naor M., Pinkas B., Reingold O. (1999) Distributed Pseudorandom Functions and KDCs. In: Stem J. (eds) Advances in Cryptology—EUROCRYPT '99. EUROCRYPT 1999. Lecture Notes in Computer Science, vol 1592. Springer, Berlin, Heidelberg.

4. Secure Memory

Secure memory 312 may comprise a memory region of computer readable medium 306 or a standalone memory element. Secure memory 312 may store sensitive cryptographic materials in such a way that they are difficult to retrieve by an unauthorized outsider (e.g., a hacker). As an example, data stored in secure memory 312 may be stored in encrypted form. The secure memory 312 may store a secret share 314 derived from a shared secret. Additionally, secure memory 312 may store a verification share 316 derived from a verification value and a verification key 318 corresponding to the verification value. Cryptographic device 300 may use secret share 314 to generate a partial computation that is used to generate a cryptographic key. Likewise, cryptographic device 300 may use verification share 316 to derive a partial signature used to generate a verification signature. Cryptographic device 300 may use verification key 318 to verify a verification signature generated from a plurality of partial signatures.

III. Generating and Distributing Secret Shares and Verification Values

Before describing methods for improved distributed symmetric cryptography, it may be helpful to describe methods that may be used to distribute secret shares and verification shares to cryptographic devices in a cryptographic device network.

For the purposes of illustration, a non-limiting example of generation and distribution of secret shares and verification shares is described below with reference to FIGS. 4 and 5. However, it should be understood that any appropriate method may be used to generate and distribute secret shares and verification shares to cryptographic devices.

Figure 4:
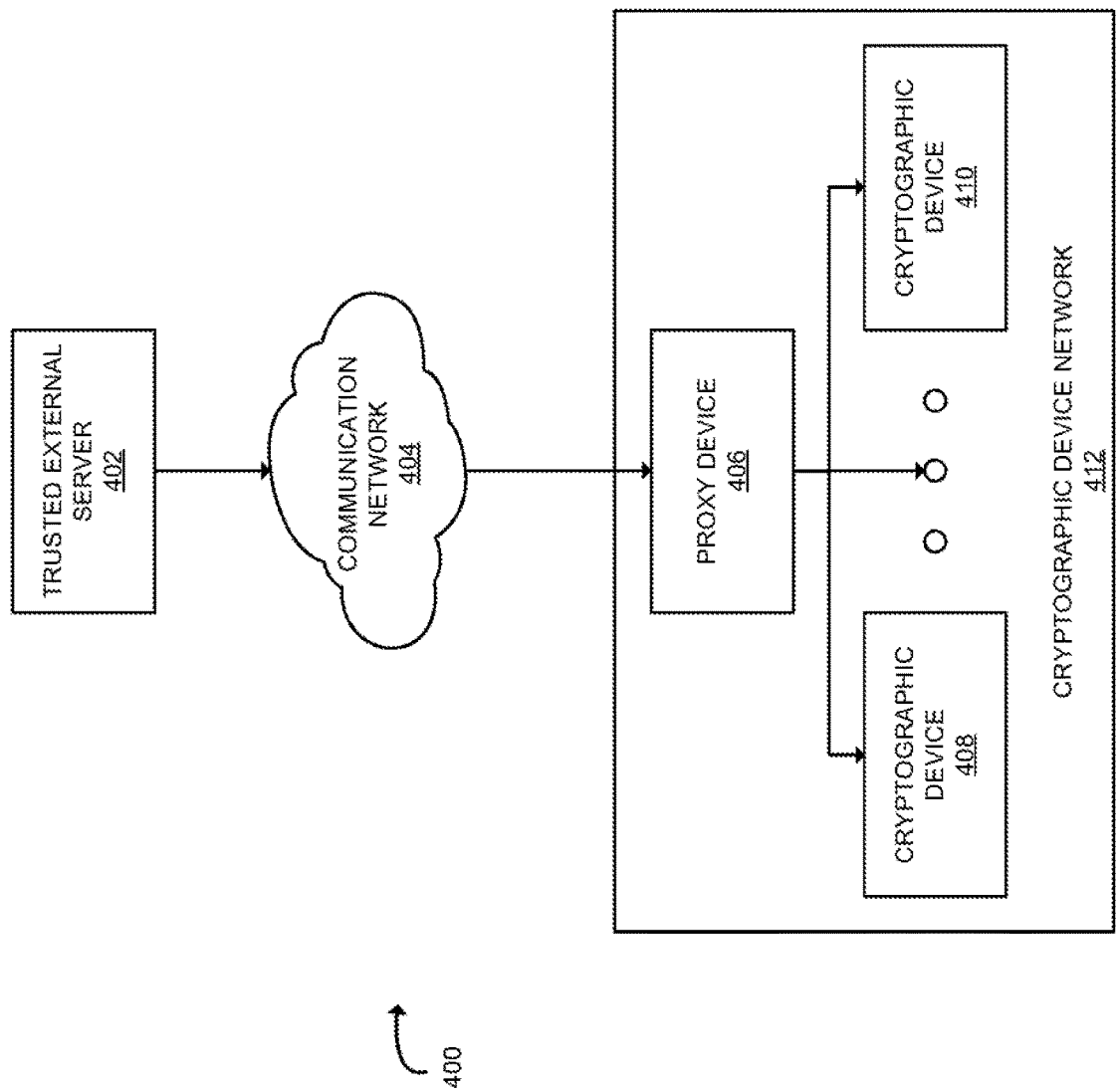
FIG. 4 shows a system block diagram for an exemplary secret share and verification share provisioning system according to some embodiments

FIG. 4 shows a share distribution system 400 comprising a trusted external server 402, a communication network 404 and a cryptographic device network 412. The cryptographic device network 412 may comprise an optional proxy device 406 and cryptographic devices 408-410. Notably, although only two cryptographic devices 408 and 410 are shown, the cryptographic device network 412 may comprise any number of cryptographic devices.

The trusted external server 402 can comprise a server computer capable of generating and distributing secret shares, verification shares, and verification keys. The trusted external server 402 may be capable of communicating with cryptographic devices 408-410 or proxy device 406 via communication network 404. The trusted external server 402 may possess a processor and a computer readable medium, and may be capable of performing any operations necessary to generate shared secrets, secret shares, verification values, or verification shares in accordance with any appropriate secret sharing scheme (e.g., Shamir's secret sharing, as described above). As an example, the trusted external server 402 could generate a number of random numbers, corresponding to the coefficients of a polynomial P(x). One of these random numbers can be interpreted as a shared secret or verification value. The trusted external server 402 could evaluate the polynomial P(x) at distinct values of x. Secret shares (and/or verification shares) comprising the evaluated polynomial and the corresponding values of x could be distributed to cryptographic devices 408 and 410.

The communication network 404 may comprise a network such as the Internet or a cellular communication network by which devices, computers, and servers can communicate with one another. The communication network 404 may be secure or unsecure. The trusted external server 402 may communicate with the cryptographic device network 412 via communication network 404, e.g., the trusted external server 402 may transmit secret shares, verification shares, and verification keys to the cryptographic device network via communication network 404.

The cryptographic device network 412 may comprise cryptographic devices 408 and 410, as well as a proxy device 406. The proxy device 406 may serve as a gateway that mediates communication between cryptographic devices 408 and 410 and computers, devices, or servers external to the cryptographic device network 412 (e.g., trusted external server 402). Secret shares or verification shares may be transmitted by trusted external server 402 to proxy device 406 via communication network 404. Proxy device 406 may distribute the secret shares to their respective cryptographic devices.

Cryptographic devices 408 to 410 may be substantially similar to cryptographic devices described above with reference to FIGS. 1 and 3. They may possess a processor, communication interface, and a computer readable medium. The computer readable medium may possess or comprise a number of software modules used by the cryptographic devices 408 and 410 for performing distributed symmetric cryptography. The cryptographic devices 408 and 410 may additionally comprise a secure memory element. The cryptographic devices 408 and 410 may store secret shares, verification shares, and verification keys received from trusted external server 402 in their respective secure memory elements.

Figure 5:
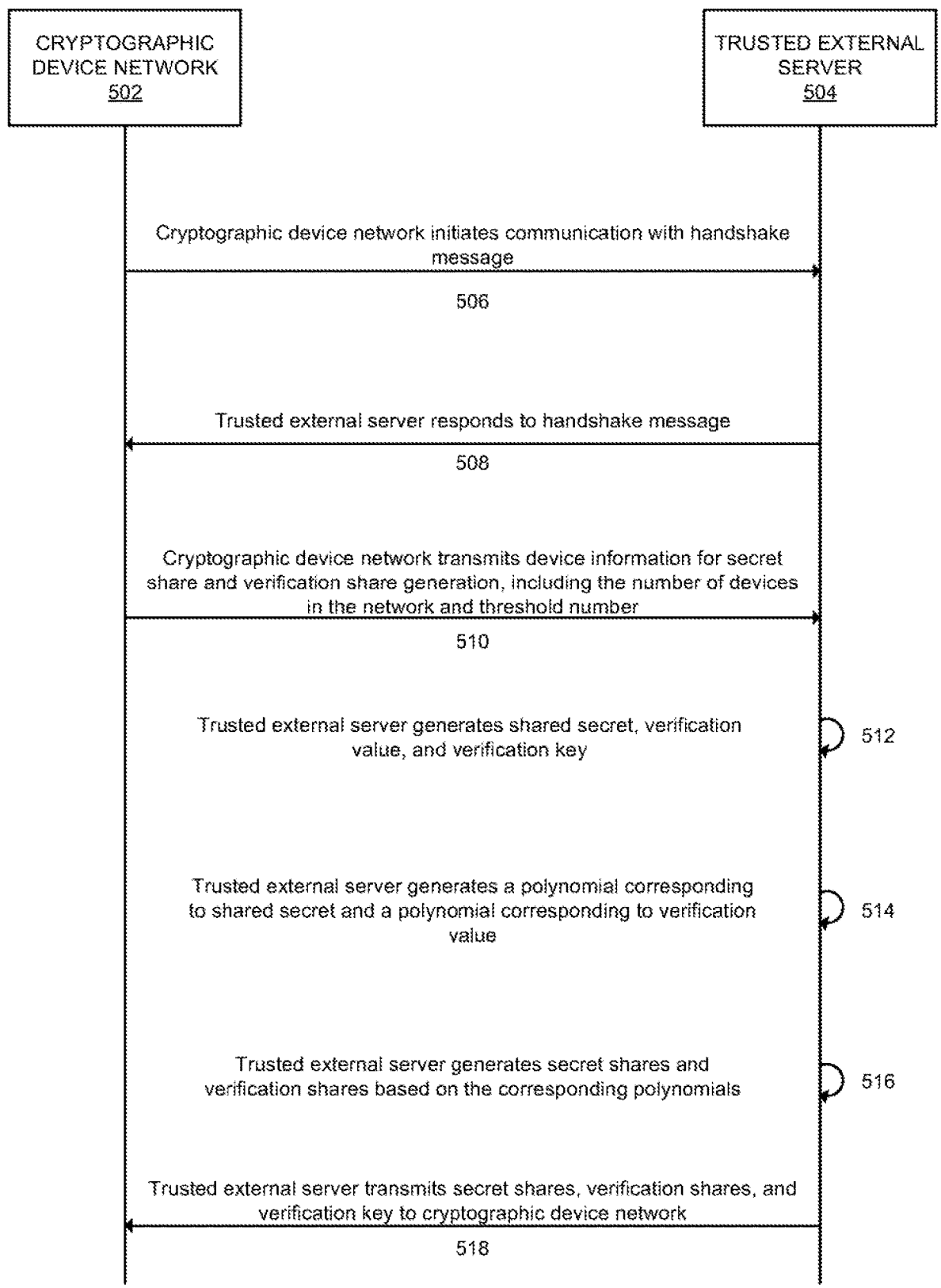
FIG. 5 shows a sequence diagram for an exemplary secret share and verification share provisioning process according to some embodiments.

FIG. 5 shows a sequence diagram detailing one exemplary method by which secret shares, verification values, and verification keys could be generated and distributed. It should be understood that embodiments can be practiced with any appropriate method for generating and distributing secret shares, verification shares, and verification keys, and thus the exemplary method of FIG. 5 is intended to be non-limiting. Although the communication network 404 from FIG. 4 is not explicitly shown, communications between the cryptographic device network 502 and trusted external server 504 may pass through a communications network. Likewise, although proxy device 404 from FIG. 4 is not shown, communications to the cryptographic device network 502 may be received by a proxy device on behalf of the cryptographic device network.

Steps 506 and 508 are two steps of a handshaking procedure between the cryptographic device network 502 and the trusted external server 504. Some communication protocols, such as the transmission control protocol (TCP) use handshaking procedures to establish the rules or characteristics of future communications between the participating computers. As an example, if communications between cryptographic device network 502 and trusted external server 504 are encrypted, steps 506 and 508 may involve an exchange of encryption keys between the cryptographic device network 502 and trusted external server 504.

For example, the cryptographic device network 502 (or a proxy device) may possess a symmetric cryptographic key that can be used to encrypt and decrypt messages sent between the cryptographic device network 502 and the trusted external server 504. The trusted external server 504 may possess a private key of a public-private key pair. The cryptographic device network 502 could use the public key of the public-private key pair to encrypt the symmetric cryptographic key, then transmit the symmetric cryptographic key to the trusted external server 504. Using the private key, the trusted external server 504 can decrypt the symmetric cryptographic key. At this point, both the cryptographic device network 502 and trusted external server 504 possess the symmetric cryptographic key. The cryptographic device network 502 and trusted external server 504 can use the symmetric cryptographic key to encrypt and decrypt any future communications between them.

At step 510 the cryptographic device network 502 may transmit information necessary to complete the secret share and verification share generation and distribution process. This could include information such as the number of devices in the cryptographic device network, the threshold number of devices for the cryptographic device network, address information, and any requested sampling values. Address information may comprise digital addresses associated with each cryptographic device in the cryptographic device network 502, such as IP addresses or MAC addresses. Requested sample values may correspond to particular values of x used to sample a polynomial P(x) in order to generate secret shares or verification values. For example, a sample value may be the number 5, and the secret share corresponding to that sample value may comprise (5, P(5)).

As an example, in step 510, the cryptographic device network 502 could transmit a series of packets, each containing the requested sample value, and the address for each cryptographic device corresponding to the requested sample value, such as the IP address or MAC address. Additionally, the packets may include information such as a TCP or UDP port on which to communicate with the cryptographic devices in the cryptographic device network 502.

At step 512 the trusted external server 504 can generate the secret share, verification value, and verification key. Methods by which the trusted external server 504 generate the shared, verification value, and verification key depend on the secret sharing methodology used, as well as the distributed pseudorandom function used during distributed symmetric cryptography. Likewise, the method by which verification values and verification keys are generated depend on the particular methods used to verify verification signatures using verification keys. In some embodiments, the shared secret may comprise a random number, and the trusted external server 512 may generate the shared secret using a cryptographically secure random number generator. In some embodiments, the verification value and verification key may comprise an asymmetric key pair, and the verification value and verification key may be generated using any appropriate means for generating asymmetric key pairs according to any appropriate cryptosystem (e.g., RSA).

At step 514, the trusted external server 504 can generate a first polynomial corresponding to the shared secret and a second polynomial corresponding to the verification value. The trusted external server can encode the shared secret into one of the coefficients of the first polynomial and encode the verification value into one of the coefficients of the second polynomial. In some embodiments, the shared secret and verification value may be encoded into the zeroth order coefficient of their respective polynomials. The trusted external server 504 may generate other coefficients of the first and second polynomials using any appropriate techniques. For example, the other coefficients may comprise random or pseudorandom numbers.

Characteristics of the polynomials (e.g., how may coefficients to include) may be based wholly or in part on information received by the trusted external server 504 in step 510 (e.g., the number of secret shares and verification shares). As described above, k+1 unique points are needed to uniquely define a polynomial of degree k (i.e., possessing k+1 coefficients, including the zeroth order coefficient). Thus the number of coefficients in the first polynomial may be equal to a threshold number of secret shares requested at step 510. Likewise, the number of coefficients in the second polynomial may be equal to a threshold number of verification shares requested at step 510.

At step 516, the trusted external server 504 may generate secret shares and verification shares based on the corresponding polynomials. The trusted external server 504 may sample the secret share polynomial and the verification share polynomial at unique values of x in order to produce corresponding values of P(x). These paired (x, P(x)) values may comprise the secret shares. The x values may comprise preferred sampling values provided to the trusted external server 504 at step 510.

At step 518 the trusted external server 504 may transmit the secret shares, verification shares, and verification key to cryptographic devices in the cryptographic device network 502 using routing or address information provided in step 510. In this way each cryptographic device in the cryptographic device network 502 may receive its respective secret share and verification share, as well as the verification key common to all cryptographic devices.

The exemplary method of FIG. 5 is one non-limiting example of a secret share generation and distribution process. There are numerous variations that may become apparent to one skilled in the art. As another example, the cryptographic devices could receive their respective secret shares via a cryptographic method such as oblivious transfer. As another example, the cryptographic device network 502 could generate the secret shares without the assistance of a trusted external server 504 at all, by using methods such as secure multi-party computation.

IV. Distributed Symmetric Operations

A. Encryption

Figure 6:
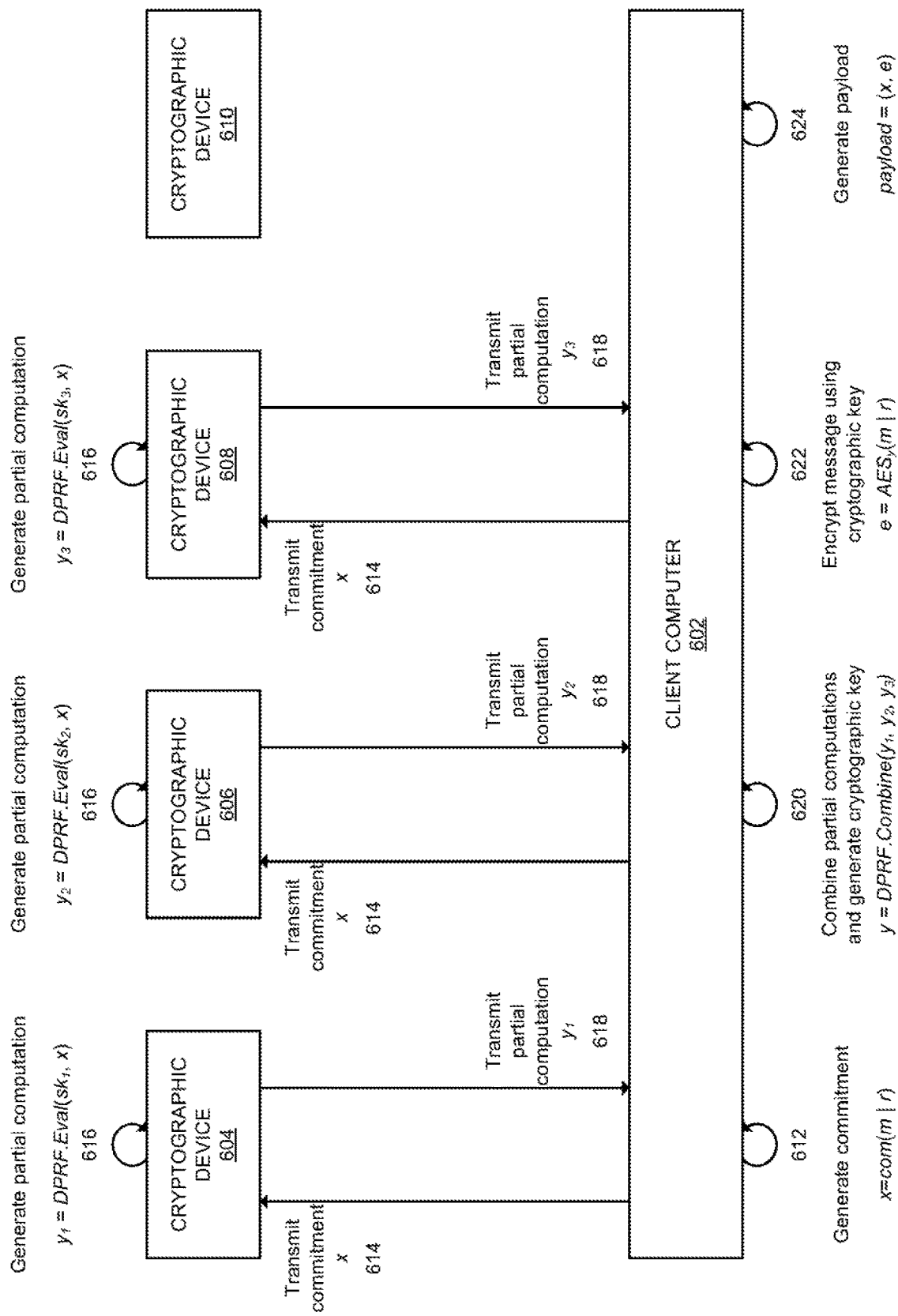
FIG. 6 shows a hybrid sequence diagram for an exemplary method of distributed symmetric encryption.

Distributed symmetric encryption may be better understood with reference to FIG. 6. FIG. 6 shows a distributed symmetric encryption process that may be improved according to some embodiments. In improved distributed symmetric encryption (described below with reference to FIG. 8) the client computer generates a verification signature using a plurality of partial signatures generated by cryptographic devices. During improved distributed symmetric decryption, the client computer provides the verification signature to the cryptographic devices. The verification signature indicates to the cryptographic devices that the client computer is performing decryption. By contrast, in distributed symmetric decryption, the client computer does not generate a verification signature. As a result, the cryptographic devices cannot determine whether the client computer is performing distributed symmetric encryption or distributed symmetric decryption.

FIG. 6 shows a hybrid sequence diagram of a client computer 602 and a plurality of cryptographic devices 604-610 performing a distributed symmetric encryption process. The client computer 602 may perform the distributed symmetric encryption process with a threshold number of cryptographic devices, which may be less than a total number of cryptographic devices. As indicated in FIG. 6, the client computer 602 is performing distributed symmetric encryption with cryptographic devices 604-608 and not with cryptographic device 610. Although four cryptographic devices 604-610 are shown in FIG. 6, it should be understood that distributed symmetric encryption can be performed with any number of cryptographic devices.

At step 612, the client computer 602 can generate a commitment x. The commitment may be generated based off a message m and a random value r (alternatively "random nonce"). The commitment x may comprise a hash value produced by using the message m and the random value r as an input to a hash function (e.g., SHA-256).

At step 614, the client computer 602 may transmit the commitment x to a plurality of participating cryptographic devices, i.e., cryptographic devices 604-608. The client computer 602 may transmit the commitment x to the participating cryptographic devices 604-608 either directly or via a proxy device.

At step 616, the cryptographic devices 604-608 may generate partial computations $y_1$, $y_2$, and $y_3$ based on the commitment x and their respective secret shares $sk_1$, $sk_2$, and $sk_3$. The cryptographic devices 604-608 may generate these partial computations $y_1$, $y_2$, and $y_3$ using a distributed pseudorandom function, as described above in Section I. The cryptographic devices 604-608 may generate the partial computation $y_1$, $y_2$, and $y_3$ by calling a distributed pseudorandom evaluation function DPRF.Eval, using the commitment x and the respective secret shares $sk_1$, $sk_2$, and $sk_3$ (i.e., $y_i$=DPRF.Eval($sk_i$, x)). The distributed pseudorandom function may comprise an elliptic curve cryptographic function. For example, cryptographic devices 604-608 may generate their corresponding partial computation $y_i$ by encrypting the commitment x using their respective secret share $sk_i$ and elliptic curve cryptography.

At step 618, the participating cryptographic devices 604-608 may transmit the partial computations $y_1$, $y_2$, and $y_3$ to client computer 602. The participating cryptographic devices 604-608 may transmit the partial computations $y_1$, $y_2$, and $y_3$ either directly or via a proxy device.

Optionally at step 618, the participating cryptographic devices 604-608 may each transmit a non-interactive zero-knowledge proof (NIZK) to the client computer 602. The client computer 602 may use the NIZKs to verify that the partial computations $y_1$, $y_2$, and $y_3$ corresponding to those NIZKs were generated correctly. If any NIZKs fail to verify, the client computer 602 can abort the distributed symmetric encryption process.

At step 620, client computer 602 may combine the partial computations and generate a cryptographic key. Client computer 602 may combine the partial computations $y_1$, $y_2$, and $y_3$ to generate a key generation seed, and the key generation seed may be used along with a key generation algorithm to generate the cryptographic key. The client computer 602 may combine the partial computations using any appropriate means. For example, the client computer can use a distributed pseudorandom combination function DPRF.Combine using the partial computations $y_1$, $y_2$, and $y_3$ as arguments (i.e., y=DPRF.Combine($y_1$, $y_2$, $y_3$)). This function may involve client computer 602 determining a plurality of Lagrange coefficients corresponding to the plurality of partial computations. The client computer 602 may generate a plurality of intermediate computations by exponentiating each partial computation with its corresponding Lagrange coefficient. The client computer 602 may generate a key generation seed by calculating the product of the plurality of intermediate computations. The key generation seed may be input into a key generation algorithm to produce the cryptographic key. See Section I above for more detail.

At step 622, the client computer 602 can encrypt the message m using the cryptographic key to generate a ciphertext e. Alternatively, client computer 602 can encrypt the message m and the random number r used to blind the commitment (see step 612). The client computer 602 can encrypt the message using any appropriate symmetric cryptosystem corresponding to the cryptographic key, such as AES (e.g., as shown at step 622, the ciphertext e=$AES_y$ (m|r)).

At step 624, the client computer 602 can generate a payload comprising the ciphertext e and the commitment x. This payload comprises the information needed to decrypt the ciphertext using distributed symmetric cryptography. The client computer 602 can transmit this payload to another client computer in order to securely transmit the message.

B. Decryption

Figure 7:
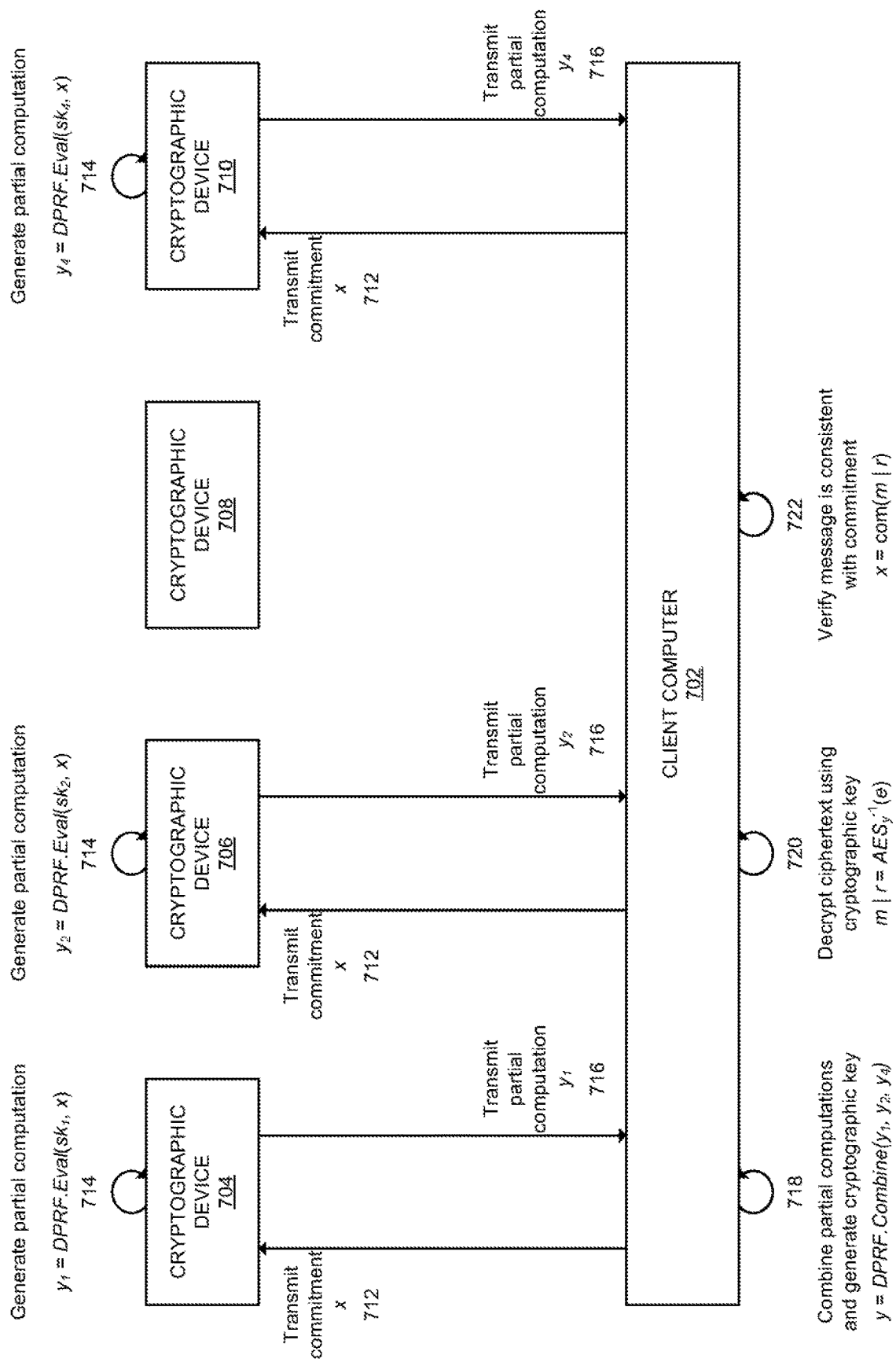
FIG. 7 shows a hybrid sequence diagram for an exemplary method of distributed symmetric decryption.

Distributed symmetric decryption may be better understood with reference to FIG. 7. FIG. 7 shows a distributed symmetric decryption process that may be improved according to some embodiments of the disclosure. In improved symmetric decryption (described below with reference to FIG. 9) the client computer transmits a verification signature to participating cryptographic devices. The verification signature indicates to the cryptographic devices that the client computer is performing decryption. By contrast, in FIG. 7, the client computer does not transmit a verification signature to the cryptographic devices. As a result, the cryptographic devices cannot determine whether the client computer is performing distributed symmetric encryption or distributed symmetric decryption.

FIG. 7 shows a hybrid sequence diagram of a client computer 702 and a plurality of cryptographic deices 704-710 performing a distributed symmetric decryption process. The client computer 702 may perform the distributed symmetric decryption process with a threshold number of cryptographic devices, which may be less than a total number of cryptographic devices. As indicated in FIG. 7, the client computer 702 is performing distributed symmetric decryption with cryptographic devices 704, 706, and 710. Notably, the client computer 702 can perform distributed symmetric decryption with cryptographic devices other than the cryptographic devices used during distributed symmetric encryption (e.g., cryptographic devices 604-608 from FIG. 6). Cryptographic device 708 may not have been selected by the client computer 702 to participate in the distributed symmetric decryption process.

In some cases, the term "cryptographic devices" may refer to cryptographic devices involved in distributed symmetric encryption, while the term "additional cryptographic devices" may refer to cryptographic devices involved in distributed symmetric decryption. The term "additional partial computations" may refer to partial computations generated by additional cryptographic devices, i.e., those involved in distributed symmetric decryption. Likewise, the term "additional secret shares" may refer to secret shares corresponding to additional cryptographic devices.

At step 712 the client computer 702 can transmit the commitment x to the cryptographic devices 704, 706, and 710. The client computer 702 may have generated this commitment itself, or may have received the commitment from another computer, such as another client computer. For example, another client computer may have performed a distributed symmetric encryption process and generated a payload comprising a ciphertext e and a commitment x. The other client computer may have transmitted this payload to client computer 702, and client computer 702 may transmit the commitment received in the payload to cryptographic devices 704, 706, and 710. The client computer 702 may transmit the commitment to cryptographic devices 704, 706, and 710 either directly or via a proxy device.

At step 714, cryptographic devices 704, 706, and 710 may generate partial computations $y_1$, $y_2$, and $y_4$ based on the commitment x and their respective secret shares $sk_1$, $sk_2$, and $sk_4$. The cryptographic devices 704, 706, and 710 may generate these partial computations using a distributed pseudorandom function, as described above in Section I. For example, as shown in FIG. 7, cryptographic devices 704, 706, and 710 may execute a DPRF.Eval function using their respective secret shares and the commitment as arguments. The distributed pseudorandom function may comprise an elliptic curve cryptographic function. For example, cryptographic devices 704, 706, and 710 may each generate a partial computation by encrypting the commitment using their respective secret share and elliptic curve cryptography.

At step 716, the participating cryptographic devices 704, 706, and 710 may transmit the partial computations $y_1$, $y_2$, and $y_4$ to client computer 702. The participating cryptographic devices 704, 706, and 710 may transmit the partial computations either directly or via a proxy device.

Optionally at step 716, the participating cryptographic devices 704, 706, and 710 may each transmit a non-interactive zero knowledge proof (NIZK) to the client computer 702. The client computer 702 may use the NIZKs to verify that the partial computations corresponding to those NIZKs were generated correctly. If any NIZKs fail to verify, the client computer can abort the distributed symmetric decryption process.

At step 718, client computer 702 may combine the partial computations and generate a cryptographic key. Client computer 702 may combine the partial computations to generate a key generation seed, then use the key generation seed as an input to a key generation algorithm in order to generate the cryptographic key. The client computer 702 may combine the partial computations using any appropriate means, such as a DPRF.Combine function that uses the partial computations $y_1$, $y_2$, and $y_4$ as arguments. For example, client computer 702 may first determine a plurality of Lagrange coefficients corresponding to the plurality of partial computations. Client computer 702 may generate a plurality of intermediate computations by exponentiating each partial computation with its corresponding Lagrange coefficient. Client computer 702 may generate a key generation seed by calculating the product of the plurality of intermediate computations. The key generation seed may be input into a key generation algorithm to produce the cryptographic key. See Section I above for more detail.

At step 720, client computer 702 can decrypt the ciphertext to produce the message m. Alternatively, client computer 702 can decrypt the ciphertext to produce the message m and a random value r used to blind the commitment (see step 612 of FIG. 6). The client computer 702 can decrypt the ciphertext using any appropriate symmetric cryptosystem corresponding to the cryptographic key, such as AES (e.g., as shown in FIG. 7, m|r=$AES_y^{-1}(e)$).

At optional step 722, client computer 702 can verify the message is consistent with the commitment m. Client computer 702 can use the message and the random value as an input to a hash function to generate an additional commitment. The client computer 702 can then compare the commitment transmitted in step 712 to the commitment generated at step 722. If the commitments are identical, it indicates that the message was encrypted and decrypted correctly.

V. Improved Distributed Symmetric Operations

As indicated above, in distributed symmetric operations, it may not be possible for the cryptographic devices to determine whether the client computer is encrypting a message or decrypting ciphertext. This is because distributed encryption and decryption is substantially the same from the perspective of the cryptographic devices: The client computer transmits a commitment to the cryptographic devices, the cryptographic devices generate a partial computation, and the cryptographic devices return the partial computation to the client computer. The client computer then generates a cryptographic key based on the partial computations and uses the cryptographic key to encrypt a message or decrypt ciphertext. As such, in distributed symmetric operations, it may not be possible for the cryptographic devices to determine whether the client computer is encrypting data or decrypting data. This in turn makes it difficult to log the behavior of client computers, or prevent misuse by malicious client computers.

Improved distributed symmetric cryptography involves the use of a threshold signature scheme. During improved symmetric encryption, the cryptographic devices generate partial signatures based on a commitment received from the client computer. The client computer can then combine these partial signatures to produce a verification signature. During decryption, the verification signature can be provided by the client computer to the cryptographic devices. The cryptographic devices can verify the verification signature using a verification key, then choose to participate in distributed symmetric decryption provided the verification signature is successfully verified.

The presence or absence of a verification signature indicates to the cryptographic devices which distributed cryptographic operation is being performed. If a verification signature is generated during the distributed cryptographic operation, the cryptographic devices can determine that the client computer is performing encryption. If a verification signature is verified during the distributed cryptographic operation, the cryptographic devices can determine that the client computer is performing decryption. In this way, the behavior of the client computer can be logged or otherwise monitored. This is an improvement over distributed symmetric operations described above in Section IV.

A. Encryption

Figure 8:
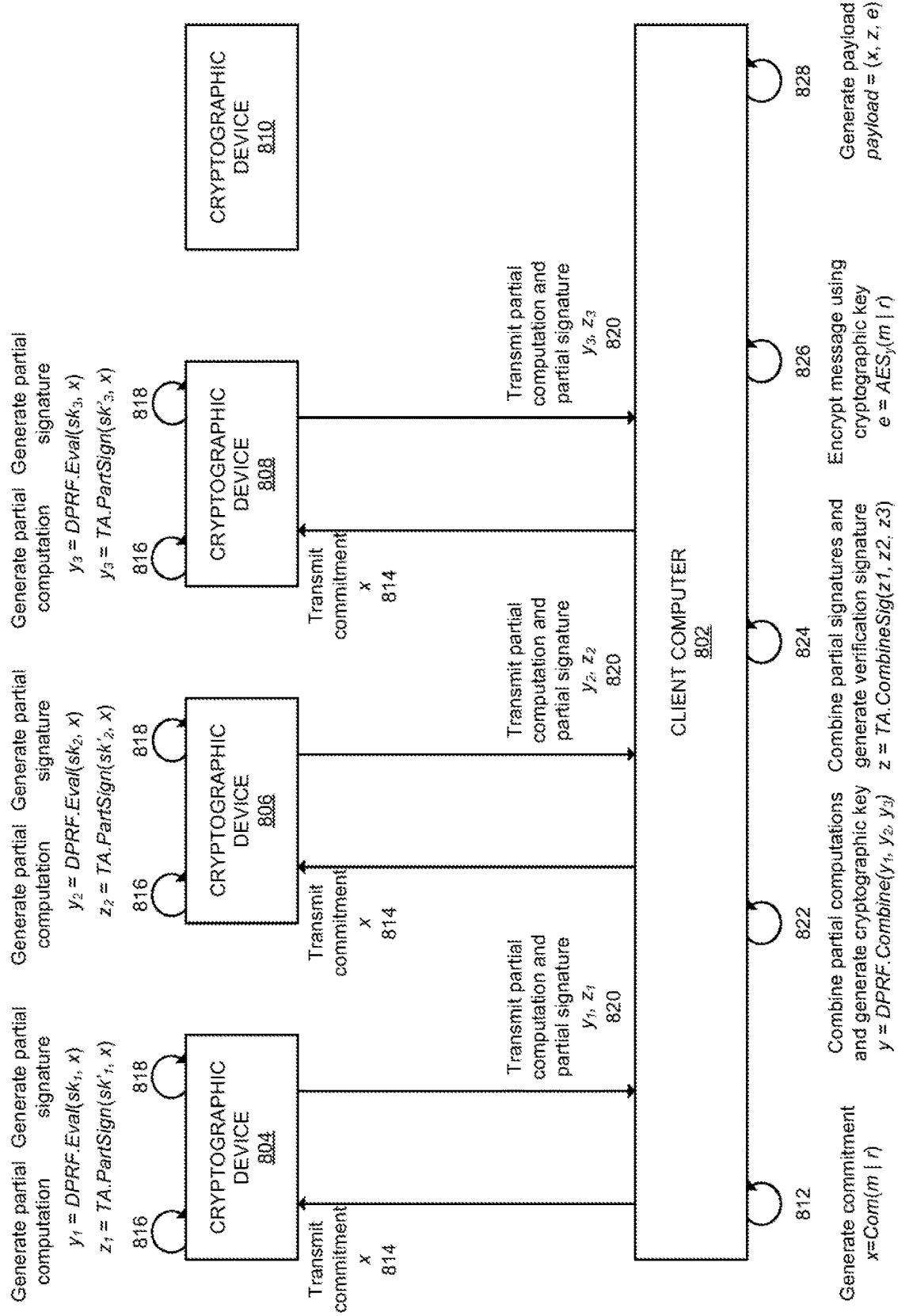
FIG. 8 shows a hybrid sequence diagram for an exemplary method of improved distributed symmetric encryption according to some embodiments.

FIG. 8 shows a hybrid sequence diagram of an exemplary method for improved distributed symmetric encryption according to some embodiments. Unlike distributed symmetric encryption, improved distributed symmetric encryption can involve the client computer generating a verification signature. This verification signature can be provided to the cryptographic devices during an improved distributed symmetric decryption process. The cryptographic devices can verify the verification signature during improved distributed symmetric decryption in order to verify that the distributed symmetric encryption was performed correctly. Further, the cryptographic devices can determine whether the client computer intends to encrypt or decrypt a message based on contents of the encryption or decryption request (e.g., presence or absence of a verification signature).

FIG. 8 shows a client computer 802 and a plurality of cryptographic devices 804-810 performing an improved distributed symmetric encryption process. The client computer 802 may perform the improved distributed symmetric encryption process with a predetermined threshold number of cryptographic devices, which may be less than a total number of cryptographic devices. As indicated in FIG. 8, the client computer 802 is performing improved distributed symmetric encryption with cryptographic devices 804-808, and not with cryptographic device 810. Notably, although four cryptographic devices 804-810 are shown, improved distributed symmetric encryption can be performed with any number of cryptographic devices.

At step 812, the client computer 802 can generate a commitment x. The commitment may be generated based off a message to be encrypted m and a random value r (alternatively "random number" or "random nonce"). The commitment may comprise a hash value produced using the message and the random value as an input to a hash function (e.g., SHA-256, SHA3, BLAKE2, etc.).

At step 814, the client computer 802 may transmit the commitment x to a plurality of participating cryptographic devices, i.e., cryptographic devices 804-808. The client computer 802 may transmit the commitment to the participating cryptographic devices 804-808 either directly or via a proxy device. The client computer 802 may additionally transmit an indicator (e.g., as a bit-wise or integer flag) to cryptographic devices 804-808. The indicator may indicate that the client computer intends to perform encryption. The cryptographic devices 804-808 may review or otherwise analyze the indicator and log or otherwise record the intent of client computer 802 in a log file.

At step 816, the cryptographic device 804-808 may generate partial computations $y_1$, $y_2$, and $y_3$ based on the commitment and their respective secret shares $sk_1$, $sk_2$, and $sk_3$. The cryptographic devices 804-808 may generate these partial computations using a distributed pseudorandom function, as described above in Section I. The distributed pseudorandom function may comprise an elliptic curve cryptographic function. For example, cryptographic devices 804-808 may generate their corresponding partial computations by encrypting the commitment using their respective secret shares and elliptic curve cryptography. The distributed pseudorandom function may comprise a DPRF.Eval function that uses the commitment and the respective secret shares as arguments.

At step 818, the cryptographic devices 804-808 may generate partial signatures $z_1$, $z_2$, and $z_3$ based on the commitment and their respective verification shares. Cryptographic device 810 may have not been selected by the client computer or the cryptographic device network to participate in the distributed symmetric encryption process. Alternatively, cryptographic device 810 may have been offline, or otherwise may not have responded to a decryption request from client computer 802. The cryptographic devices 804-808 may generate these partial signatures using the commitment x, their respective verification shares $sk'_1$, $sk'_2$, and $sk'_3$, and a distributed pseudorandom function, as described above in Section I.

The distributed pseudorandom function may comprise an elliptic curve cryptographic function. For example, cryptographic devices 804-808 may generate their corresponding partial signatures by encrypting the commitment using their respective verification shares and elliptic curve cryptography. However, it should be understood that cryptographic devices 804-808 may generate the partial signatures in any other appropriate manner. For example, using a partial signature scheme based on pairing-friendly elliptic curves, message authentication codes, hash-based message authentication codes, etc. The cryptographic devices 804-808 may generate the partial signatures using a threshold authentication partial signature function TA.PartSign using the commitment x and their respective verification shares $sk'_1$, $sk'_2$, and $sk'_3$ as arguments.

Optionally at step 818, the participating cryptographic devices 804-808 may each transmit a NIZK (Non-Interactive Zero Knowledge Proof) to the client computer 802. The client computer 802 may use the NIZKs to verify that the partial computations corresponding to those NIZKs were generated correctly. If any NIZKs fail to verify, the client computer can abort the improved distributed symmetric encryption process.

At step 820, the participating cryptographic devices 804-808 may transmit the partial computations $y_1$, $y_2$, and $y_3$, and partial signatures $z_1$, $z_2$, and $z_3$ to client computer 802. The participating cryptographic devices 804-808 may transmit the partial computations either directly or via a proxy device.

At step 822, client computer 802 may combine the partial computations and generate a cryptographic key y. Client computer 802 may combine the partial computations $y_1$, $y_2$, and $y_3$ using a DPRF.Combine function using the partial computations as arguments. In some embodiments, client computer 802 may combine the partial computations to generate a key generation seed, and the key generation seed may be used along with a key generation algorithm to generate the cryptographic key. The client computer 802 may combine the partial computations using any appropriate means. For example, client computer 802 may first determine a plurality of Lagrange coefficients corresponding to the plurality of partial computations. The client computer 802 may generate a plurality of intermediate computations by exponentiating each partial computation with its corresponding Lagrange coefficient. The client computer 802 may generate a key generations seed by calculating the product of the plurality of intermediate computations. The key generation seed may be input into a key generation algorithm to produce the cryptographic key. See Section I for more detail.

Likewise, at step 824, client computer 802 may combine the partial signatures $z_1$, $z_2$, and $z_3$ and generate a verification signature z. Client computer 802 may combine the partial signatures $z_1$, $z_2$, and $z_3$ using a TA.CombineSig function. Client computer 802 may combine the partial signatures using any appropriate means. For example, client computer 802 may first determine a plurality of Lagrange coefficients corresponding to the plurality of partial signatures. The client computer may generate a plurality of intermediate signatures by exponentiating each partial signature with its corresponding Lagrange coefficient. Client computer 802 may generate the verification signature by calculating the product of the plurality of intermediate signatures. See Section I for more detail.

At step 826, client computer 802 can encrypt the message using the cryptographic key y to generate a ciphertext e. Alternatively, the client computer 802 can encrypt the message m and the random number or nonce r used to blind the commitment (see step 812). The client computer can encrypt the message using any appropriate symmetric cryptosystem corresponding to the cryptographic key, such as AES (e.g., as shown in FIG. 8: $e=AES_y(m|r)$).

At step 828, the client computer 802 can generate a payload comprising the ciphertext e, the commitment x, and the verification signature z. This payload comprises the information needed to decrypt the ciphertext using improved distributed symmetric cryptography. The client computer 802 can transmit the payload to another client computer in order to securely transmit the message. This other client computer can then decrypt the ciphertext using improved distributed symmetric cryptography, the commitment, and the verification signature.

B. Decryption

Figure 9:
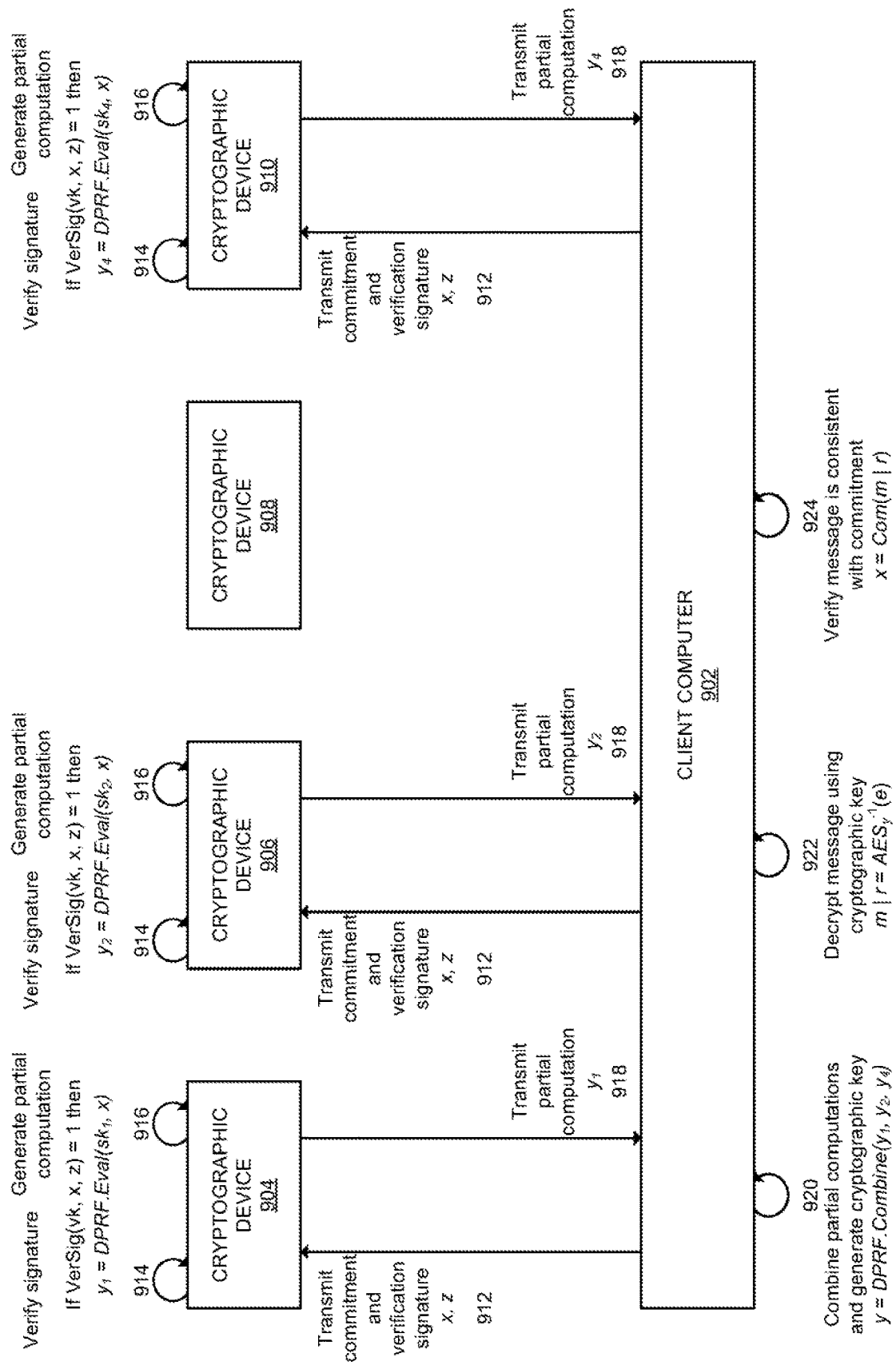
FIG. 9 shows a hybrid sequence diagram for an exemplary method of improved distributed symmetric decryption according to some embodiments.

Improved distributed symmetric decryption may be better understood with reference to FIG. 9. In improved distributed symmetric decryption, the client computer transmits a verification signature to participating cryptographic devices. The verification signature indicates to the cryptographic devices that the client computer is performing decryption. This is an improvement over distributed symmetric decryption described in Section IV, as the cryptographic devices are able to determine that the client computer is performing distributed symmetric decryption.

FIG. 9 shows a hybrid sequence diagram of a client computer 902 and a plurality of cryptographic devices 904-910 performing an improved distributed symmetric decryption process. As indicated in FIG. 9, the client computer 902 is performing improved distributed symmetric decryption with cryptographic devices 904, 906, and 910. Notably, the client computer 902 can perform improved distributed symmetric decryption with cryptographic devices other than the cryptographic devices used during improved distributed symmetric encryption (e.g., cryptographic devices 804-808 from FIG. 8).

In some cases, the term "cryptographic devices" may refer to cryptographic devices involved in improved distributed symmetric encryption, while the term "additional cryptographic devices" may refer to cryptographic devices involved in improved distributed symmetric decryption. The term "additional partial computations" may refer to partial computations generated by additional cryptographic devices, i.e., those involved in improved distributed symmetric decryption. Likewise, the term "additional secret shares" may refer to secret shares corresponding to additional cryptographic devices.

At step 912 the client computer 902 can transmit the commitment x and verification signature z to participating cryptographic devices 904, 906, and 910. The client computer 902 may have generated the commitment and verification signature itself, or may have received the commitment and verification signature from another computer, such as another client computer. For example, another client computer may have performed an improved distributed symmetric encryption process and generated a payload comprising a ciphertext, the commitment, and the verification signature (e.g., client computer 802 from FIG. 8). The other client computer may have transmitted this payload to client computer 902, and client computer 902 may transmit the commitment and the verification signature received in the payload to cryptographic devices 904, 906, and 910. Client computer 902 may transmit the commitment and verification signature to cryptographic devices 904, 906, and 910 either directly or via a proxy device. The client computer 902 can additionally transmit an indicator to participating cryptographic devices 904, 906, and 910. The indicator may indicate to the participating cryptographic devices that the client computer 902 intends to perform decryption. The participating cryptographic devices 904, 906, and 910 can record this indicator in a log file.

At step 914, cryptographic devices 904, 906, and 910 may verify the verification signature z using the commitment x and a verification key vk. This may involve the cryptographic devices 904, 906, and 910 executing a verify signature function VerSig using the verification key, the commitment, and the verification signature as arguments. If the verification signature is legitimate, cryptographic device 904, 906, and 910 may continue the improved symmetric decryption process. Otherwise, cryptographic device 904, 906, and 910 may terminate the process.

Cryptographic devices 904, 906, and 910 may verify the verification signature using any appropriate technique or means. As an example, the verification key may comprise a public key of a public-private key pair, and a verification value may comprise the private key of the public private key pair. The verification signature may be equivalent to the commitment encrypted using the verification value. Cryptographic devices 904, 906, and 910 may verify the verification signature by decrypting the verification signature using the verification key to produce the commitment. Cryptographic devices 904, 906, and 910 may then compare the commitment to the commitment received from client computer 902. If the commitments match, the verification signature may be verified as legitimate.

It should be understood that cryptographic devices 904, 906, can verify the verification signature using any appropriate method, such as the distributed signature function based method described above. The cryptographic devices 904, 906, and 910 may also verify the verification signature using a hash-based message authentication code function (HMAC function).

At step 916, provided the verification signature was determined to be legitimate, cryptographic devices 904, 906, and 910 may generate partial computations $y_1$, $y_2$, and $y_4$, based on the commitment x and their respective secret shares $sk_1$, $sk_2$, and $sk_4$. Cryptographic devices 904, 906, and 910 may generate these partial computations using a distributed pseudorandom function, as described above in Section I. For example, cryptographic devices 904, 906, and 910 may generate the partial computations by executing a DPRF.Eval function using their respective secret shares and the commitment as arguments. The distributed pseudorandom function may comprise an elliptic curve cryptographic function. For example cryptographic devices 904, 906, and 910 may each generate a partial computation by encrypting the commitment using their respective secret share and elliptic curve cryptography.

At step 918, the participating cryptographic devices 904, 906, and 910 may transmit the partial computations $y_1$, $y_2$, and $y_4$ to client computer 902. The participating cryptographic devices 904, 906, and 910 may transmit the partial computations either directly or via a proxy device.

Optionally at step 918, the participating cryptographic devices 904, 906, and 910 may each transmit a NIZK to the client computer 902. The client computer 902 may use the NIZKs to verify that the partial computations corresponding to those NIZKs were generated correctly. If any NIZKs fail to verify, the client computer can abort the improved distributed symmetric decryption process.

At step 920 the client computer 902 may combine the partial computations $y_1$, $y_2$, and $y_4$ and generate a cryptographic key y. For example, the client computer 902 may combine the partial computations using a DPRF.Combine function. In some embodiments, client computer 902 may combine the partial computations to generate a key generation seed, then use the key generation seed as an input to a key generation algorithm in order to generate the cryptographic key. The client computer 902 may combine the partial computations using any appropriate means. For example, client computer 902 may first determine a plurality of Lagrange coefficients corresponding to the plurality of partial computations. Client computer 902 may generate a plurality of intermediate computations by exponentiating each partial computation with its corresponding Lagrange coefficient. Client computer 902 may generate a key generation seed by calculating the product of the plurality of intermediate computations. The key generation seed may be input into a key generation algorithm to produce the cryptographic key. See Section I for more details.

At step 922, client computer 902 can decrypt the ciphertext e to produce the message m. Alternatively, client computer 902 can decrypt the ciphertext to produce the message m and a random value r used to blind the commitment (see step 812 of FIG. 6). The client computer 902 can decrypt the ciphertext using any appropriate symmetric cryptosystem corresponding to the cryptographic key, such as AES (e.g., as shown in FIG. 9, $m|r=AES_y^{-1}(e)$).

At optional step 924, client computer 904 can verify the message is consistent with the commitment. Client computer 902 can use the message and the random value as an input to a hash function to generate an additional commitment. Client computer 902 can then compare the commitment transmitted in step 912 to the commitment generated at step 922. If the commitments are identical, it indicates that the message was encrypted and decrypted correctly.

VI. Computer System

Figure 10:
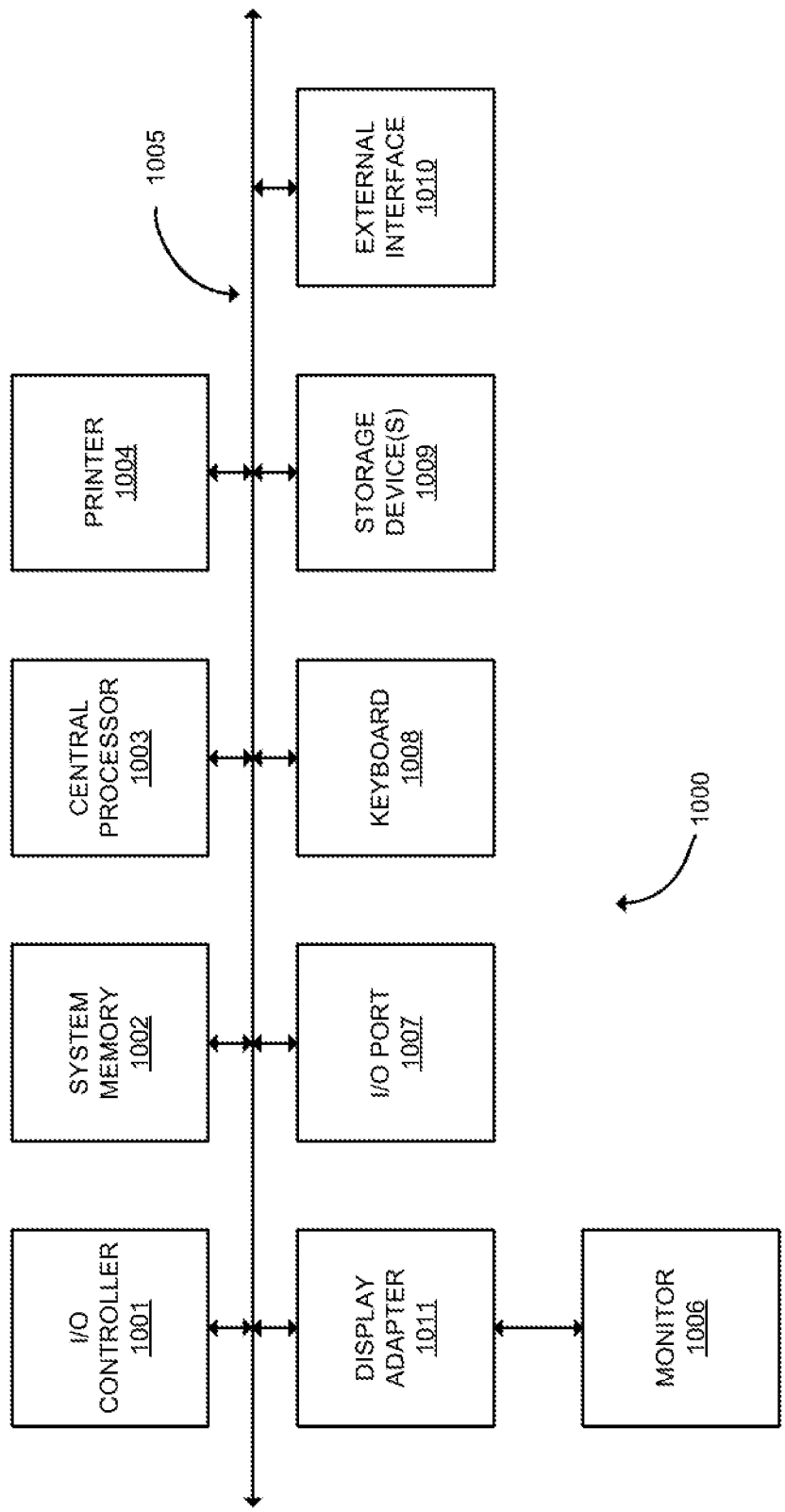
FIG. 10 shows an exemplary computer system according to some embodiments.

Any of the computer systems mentioned herein may utilize any suitable number of subsystems. Examples of such subsystems are shown in FIG. 10 in computer apparatus 1000. In some embodiments, a computer system includes a single computer apparatus and the subsystems may comprise components of the computer apparatus. In other embodiments, a computer system can include multiple computer apparatuses, each being a subsystem with internal components.

The subsystems shown in FIG. 10 are interconnected via a system bus 1005. Additional subsystems such as a printer 1004, keyboard 1008, storage device(s) 1009, monitor 1006 (coupled to display adapter 1011), and others are shown. Peripherals and input/output (I/O) devices which couple to I/O controller 1001, can be connected to the computer system by any number of means known in the art such as input/output (I/O) port 1007 (e.g., USB, FireWire®). For example, I/O port 1007 or external interface 1010 (e.g. Ethernet, Wi-Fi, etc.) can be used to connect computer system 1000 to a wide area network such as the Internet, a mouse input device, or a scanner. The interconnection via system bus 1005 allows the central processor 1003 to communicate with each subsystem and to control the execution of instructions from system memory 1002 or the storage device(s) 1009 (e.g., a fixed disk, such as a hard drive or optical disk), as well as the exchange of information between subsystems. The system memory 1002 and/or the storage device(s) 1009 may embody a computer readable medium. Any of the data mentioned herein can be output from one component to another component and can be output to the user.

A computer system can include a plurality of the same components or subsystems, e.g., connected together by external interface 1010 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising performing, by a computer system:
   generating a commitment using a message and a random value;
   transmitting a request including the commitment to each of a plurality of cryptographic devices, the plurality of cryptographic devices storing a plurality of secret shares that are generated from a secret value and a plurality of verification shares generated from a verification value, the request indicating that each of the plurality of cryptographic devices are to perform a cryptographic function corresponding to encryption;
   receiving from the plurality of cryptographic devices, a plurality of partial computations, wherein the plurality of partial computations were generated by the plurality of cryptographic devices using the plurality of secret shares and the commitment;
   receiving, from the plurality of cryptographic devices, a plurality of partial signatures, wherein the plurality of partial signatures were generated by the plurality of cryptographic devices using the plurality of verification shares and the commitment;
   generating a cryptographic key based on the plurality of partial computations;
   generating a verification signature based on the plurality of partial signatures;
   generating a ciphertext by encrypting the message and the random value using the cryptographic key;
   generating a payload comprising the ciphertext, the verification signature, and the commitment; and
   transmitting the verification signature and the commitment to the plurality of cryptographic devices or to a plurality of additional cryptographic devices for verifying the verification signature using a verification key and the commitment.

2. The method of claim 1, wherein:
   transmitting the commitment to the plurality of cryptographic devices comprises transmitting the commitment to a proxy device, wherein the proxy device transmits the commitment to the plurality of cryptographic devices;
   receiving the plurality of partial computations from the plurality of cryptographic devices comprises receiving, from the proxy device, the plurality of partial computations, wherein the proxy device receives the plurality of partial computations from the plurality of cryptographic devices; and receiving the plurality of partial signatures from the plurality of cryptographic devices comprises receiving, from the proxy device, the plurality of partial signatures, wherein the proxy device receives the plurality of partial signatures from the plurality of cryptographic devices.

3. The method of claim 1, wherein the plurality of cryptographic devices comprises at least a predetermined threshold number of cryptographic devices, and wherein the predetermined threshold number of cryptographic devices is less than a total number of cryptographic devices.

4. The method of claim 1, wherein generating the cryptographic key based on the plurality of partial computations comprises:
  generating a key generation seed based on the plurality of partial computations; and
  generating the cryptographic key by using the key generation seed as an input to a key generation function.

5. The method of claim 1, wherein generating the commitment comprises generating a hash value of the message and the random value using a hash function.

6. The method of claim 1, further comprising selecting the plurality of cryptographic devices from a network of cryptographic devices.

7. The method of claim 1, further comprising:
receiving a plurality of additional partial computations, wherein the plurality of additional partial computations were generated by the plurality of cryptographic devices or the
  plurality of additional cryptographic devices using a plurality of additional secret shares and the commitment;
  generating a second cryptographic key based on the plurality of additional partial computations; and
  decrypting the ciphertext using the second cryptographic key to produce the message and the random value.

8. The method of claim 7, wherein one or more cryptographic devices of the plurality of cryptographic devices are the same as one or more additional cryptographic devices of the plurality of additional cryptographic devices, wherein one or more secret shares of the plurality of secret shares are the same as one or more additional secret shares of a plurality of additional secret shares.

9. A method comprising performing, by a computer system:
  transmitting a verification signature and a commitment to a plurality of cryptographic devices, wherein the plurality of cryptographic devices verify the verification signature using a verification key and the commitment;
  receiving a plurality of partial computations, wherein the plurality of partial computations were generated by the plurality of cryptographic devices using a plurality of secret shares and the commitment;
  generating a cryptographic key based on the plurality of partial computations;
  decrypting a ciphertext using the cryptographic key to produce a message and a random value; and
  transmitting an indicator to the plurality of cryptographic devices, wherein the indicator indicates to the plurality of cryptographic devices that the computer system intends to perform decryption.

10. The method of claim 9, wherein the verification signature indicates to the plurality of cryptographic devices that the computer system intends to perform decryption, and wherein the plurality of cryptographic devices verify the verification signature by:
  decrypting the verification signature using the verification key to produce an additional commitment; and
  determining if the additional commitment is the same as the commitment.

11. The method of claim 9, wherein: transmitting the commitment to the plurality of cryptographic devices comprises transmitting the commitment to a proxy device, wherein the proxy device transmits the commitment to the plurality of cryptographic devices;
  transmitting the verification signature to the plurality of cryptographic devices comprises transmitting the verification signature to the proxy device, wherein the proxy device transmits the verification signature to the plurality of cryptographic devices; and
  receiving the plurality of partial computations from the plurality of cryptographic devices comprises receiving, from the proxy device, the plurality of partial computations, wherein the proxy device receives the plurality of partial computations from the plurality of cryptographic devices.

12. The method of claim 9, wherein the plurality of cryptographic devices comprises at least a predetermined threshold number of cryptographic devices, wherein the predetermined threshold number of cryptographic devices is less than a total number of cryptographic devices.

13. The method of claim 9, wherein generating the cryptographic key based on the plurality of partial computations comprises:
  generating a key generation seed based on the plurality of partial computations; and
  generating the cryptographic key by using the key generation seed as an input to a key generation function.

14. The method of claim 9, further comprising selecting the plurality of cryptographic devices from a network of cryptographic devices.

15. A method comprising performing, by a cryptographic device:
  receiving from a client computer, a request including a commitment generated using a message and a random value;
  determining that the client computer intends to encrypt the message based on contents of the request;
  generating a partial computation based on a secret share and the commitment;
  generating a partial signature based on a verification share and the commitment;
  transmitting the partial computation and the partial signature to the client computer, thereby enabling the client computer to: (1) generate a cryptographic key using the partial computation, (2) encrypt the message using the cryptographic key, thereby generating a ciphertext, (3) generate a verification signature uses the partial signature, and (4) generate a payload comprising the ciphertext, the verification signature, and the commitment;
  receiving from the client computer, the verification signature and the commitment;
  determining based on the verification signature and the commitment, that the client computer intends to decrypt the message;
  verifying the verification signature using a verification key and the commitment;
  generating the partial computation based on the commitment and the secret share; and
  transmitting the partial computation to the client computer, wherein the client computer uses the partial computation to generate the cryptographic key and uses the cryptographic key to decrypt the ciphertext to produce the message and the random value.

16. The method of claim 15, further comprising, prior to receiving the request from the client computer, receiving the secret share from a trusted external server, wherein the trusted external server also transmits one or more other secret shares to one or more other cryptographic devices.

17. The method of claim 15, wherein verifying the verification signature using the verification key and the commitment comprises:
   decrypting the verification signature using the verification key to produce an additional commitment; and
   comparing the commitment to the additional commitment.

18. The method of claim 15, further comprising:
   receiving, from the client computer, an indicator indicating that the client computer intends to decrypt the message; and
   recording that the client computer intends to decrypt the message in a log file.

\* \* \* \* \*